United States Patent [19]
Yasukawa et al.

[11] Patent Number: 5,227,836
[45] Date of Patent: Jul. 13, 1993

[54] TTL AUTOMATIC LIGHT CONTROLLING CAMERA SYSTEM

[75] Inventors: Seiichi Yasukawa, Kawasaki; Norikazu Yokonuma, Tokyo, both of Japan

[73] Assignee: Nikon Corporation, Tokyo, Japan

[21] Appl. No.: 953,765

[22] Filed: Sep. 30, 1992

Related U.S. Application Data

[63] Continuation of Ser. No. 884,890, May 18, 1992, abandoned, which is a continuation of Ser. No. 678,212, Apr. 1, 1991, abandoned.

[30] Foreign Application Priority Data

Apr. 4, 1990 [JP] Japan ................................ 2-88375
Jun. 27, 1990 [JP] Japan ................................ 2-166709

[51] Int. Cl.⁵ ............................................. G03B 15/05
[52] U.S. Cl. ................................. 354/415; 354/416; 354/127.1
[58] Field of Search ............. 354/415, 416, 417, 145.1, 354/127.1, 432

[56] References Cited

U.S. PATENT DOCUMENTS

| | | | |
|---|---|---|---|
| 32,437 | 6/1887 | Taniguchi et al. | 354/415 |
| 4,311,372 | 1/1982 | Gahler | 354/416 |
| 4,657,367 | 4/1987 | Kataoka | 354/415 |
| 5,006,879 | 4/1991 | Takagi et al. | 354/416 X |
| 5,164,759 | 11/1992 | Yasukawa | 354/415 |

Primary Examiner—Michael L. Gellner
Assistant Examiner—Jae N. Noh
Attorney, Agent, or Firm—Shapiro and Shapiro

[57] ABSTRACT

TTL automatic light controlling camera systems include a camera body and a flashing device. Depending upon the operating mode capabilities of the camera body and the flashing device, different flashing and light control operating modes may be set at the camera body or the flashing device, or both. Camera bodies have the ability to detect the operating capabilities of flashing devices used therewith, and vice versa. Some operating modes are effected automatically or are prohibited depending upon the capabilities of the camera body and the flashing device and depending upon the setting of operating modes at the camera body or the flashing device, or both. Among the possible operating modes are a TTL multicontrol mode, in which the flashing device emits preliminary (previous) light followed by a main light emission, and a TTL normal light control mode, in which the flashing device emits only main light. In the TTL multicontrol mode, quantities of reflected preliminary light from divided regions of a subject field are detected to determine weighting of the divided regions that is used in main light emission control by the camera. The operating mode may be dictated by whether charging of the flashing device is complete.

9 Claims, 19 Drawing Sheets

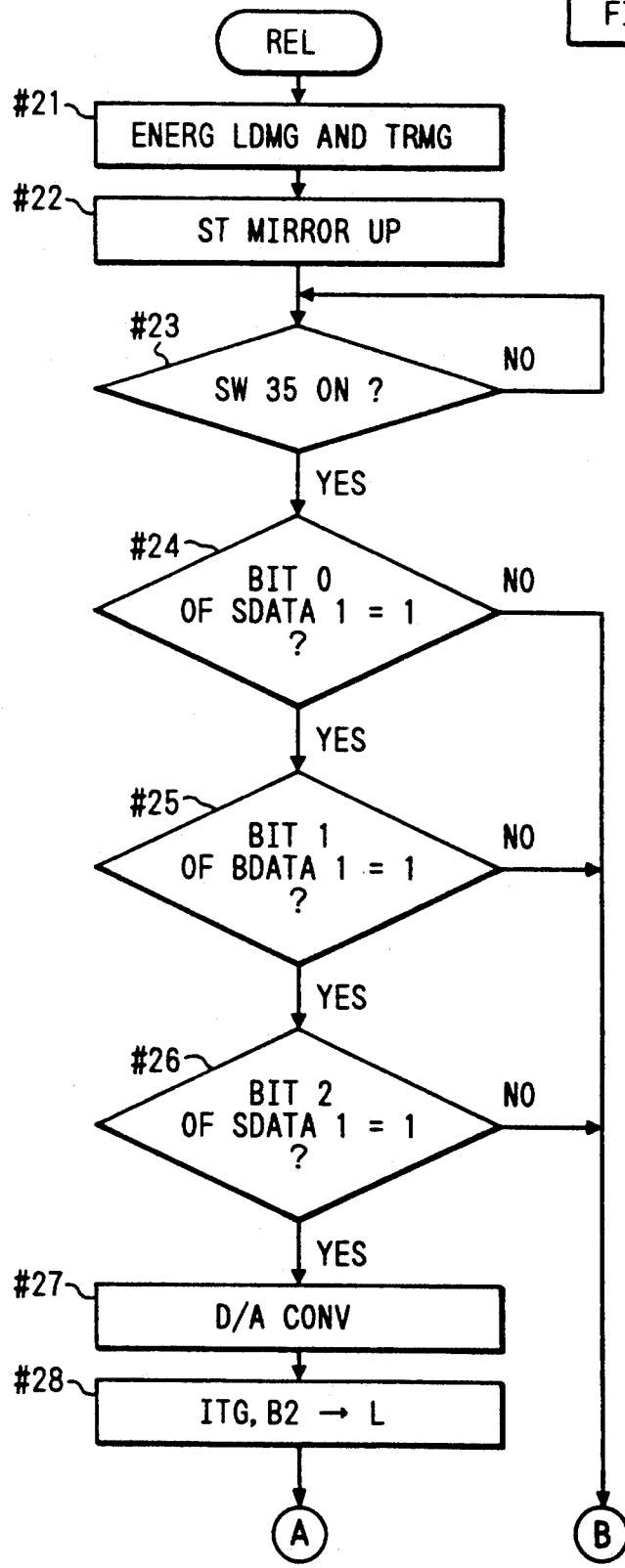

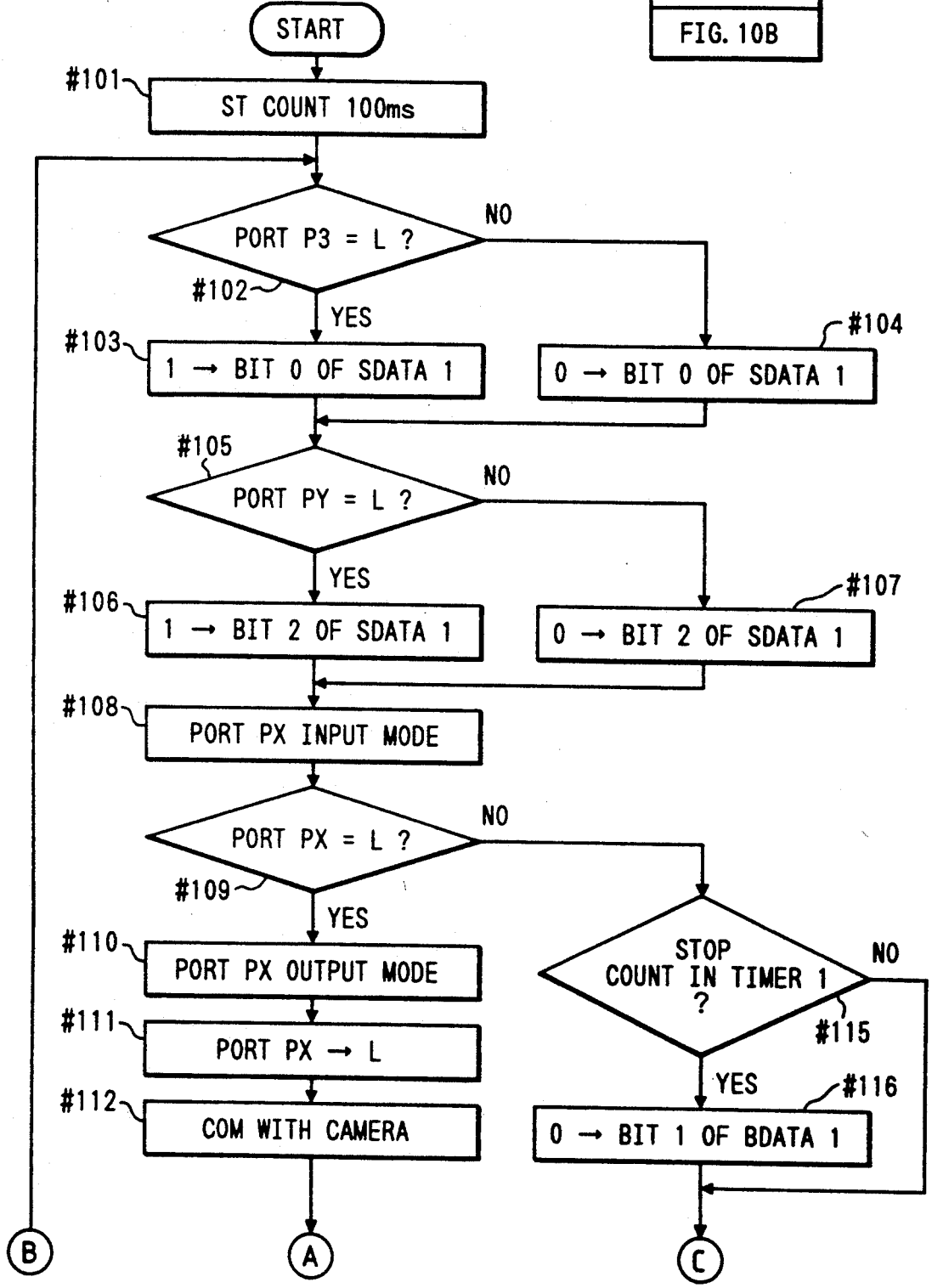

| FIG. 14B-1 |
| FIG. 14B-2 |

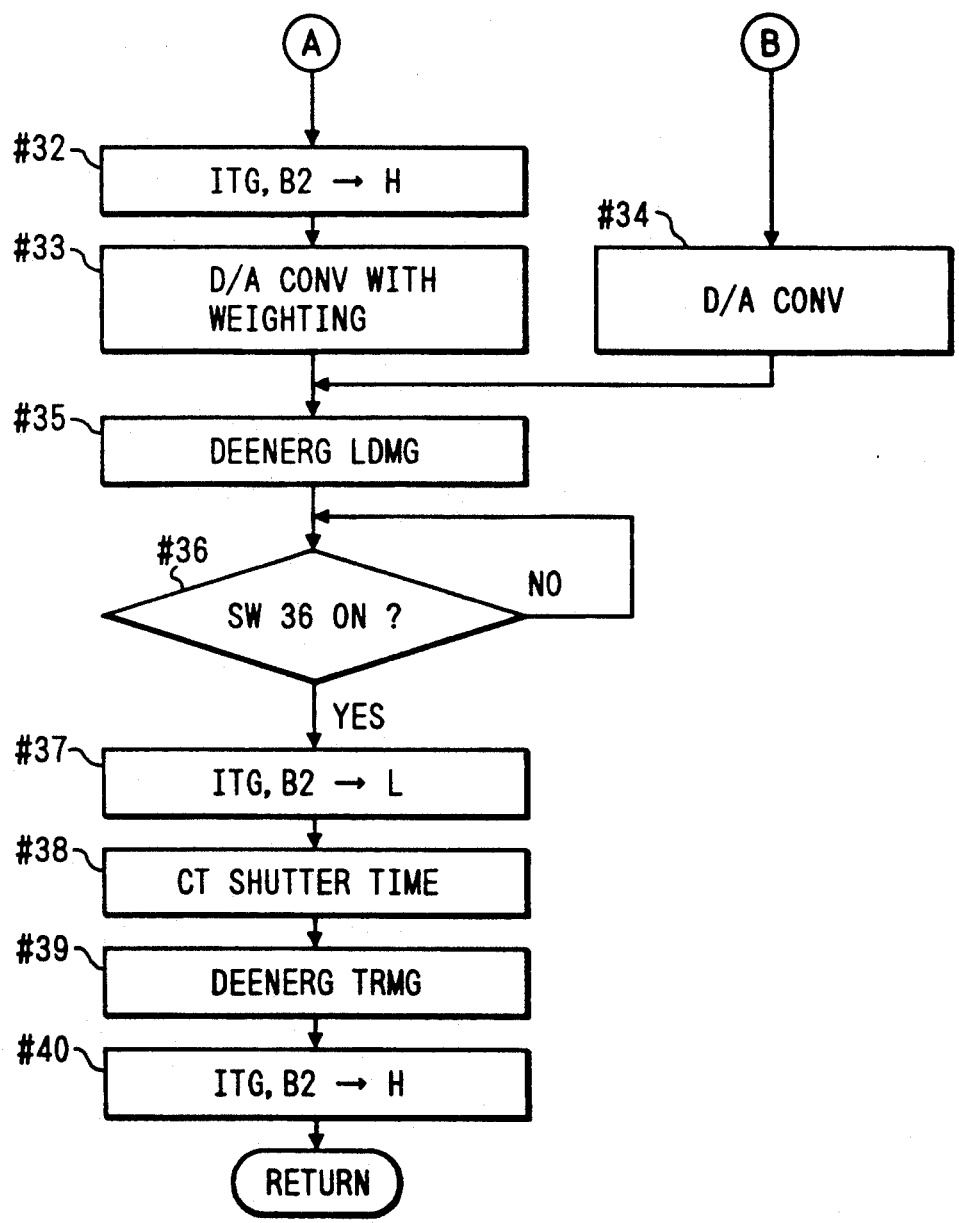

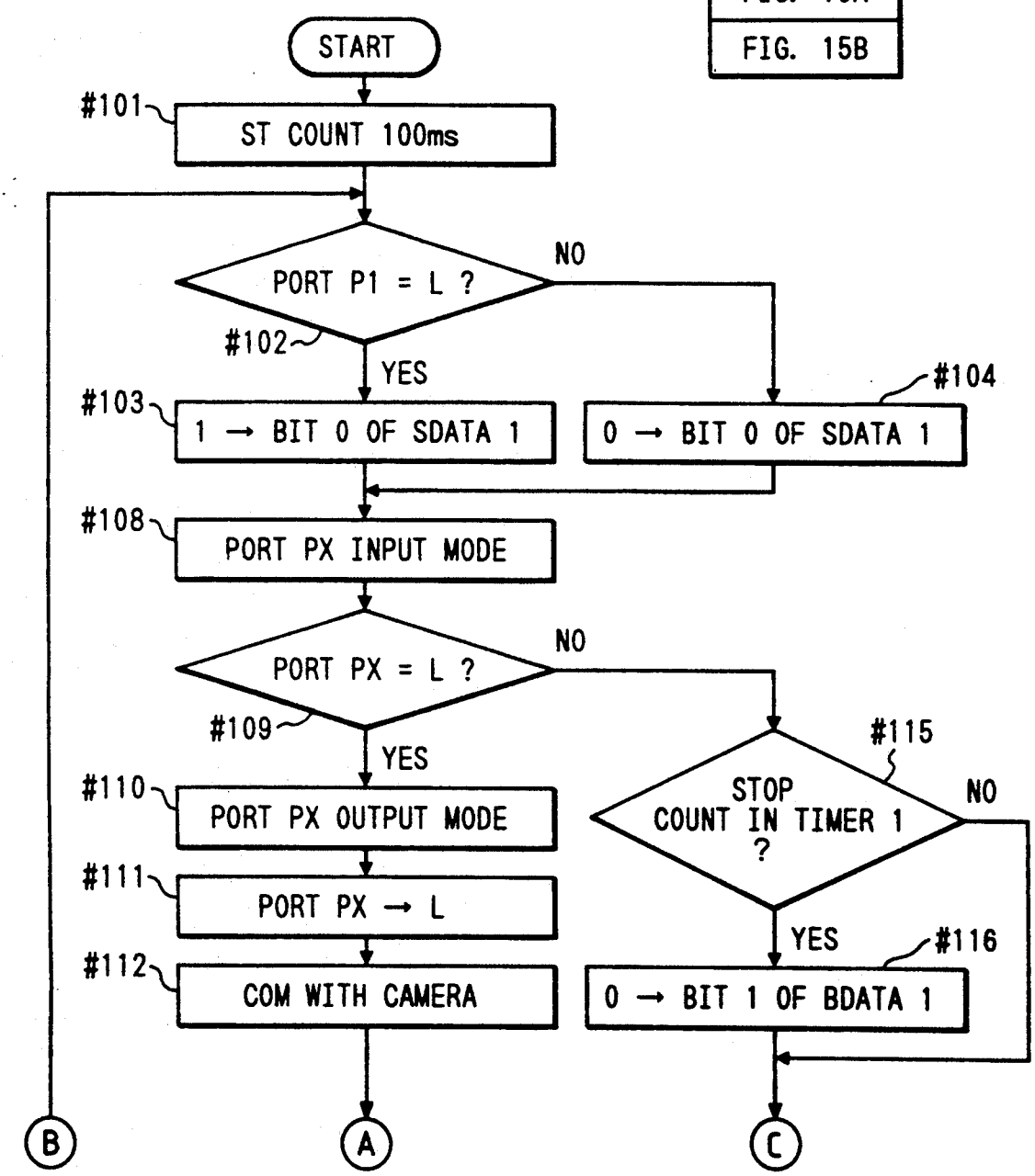

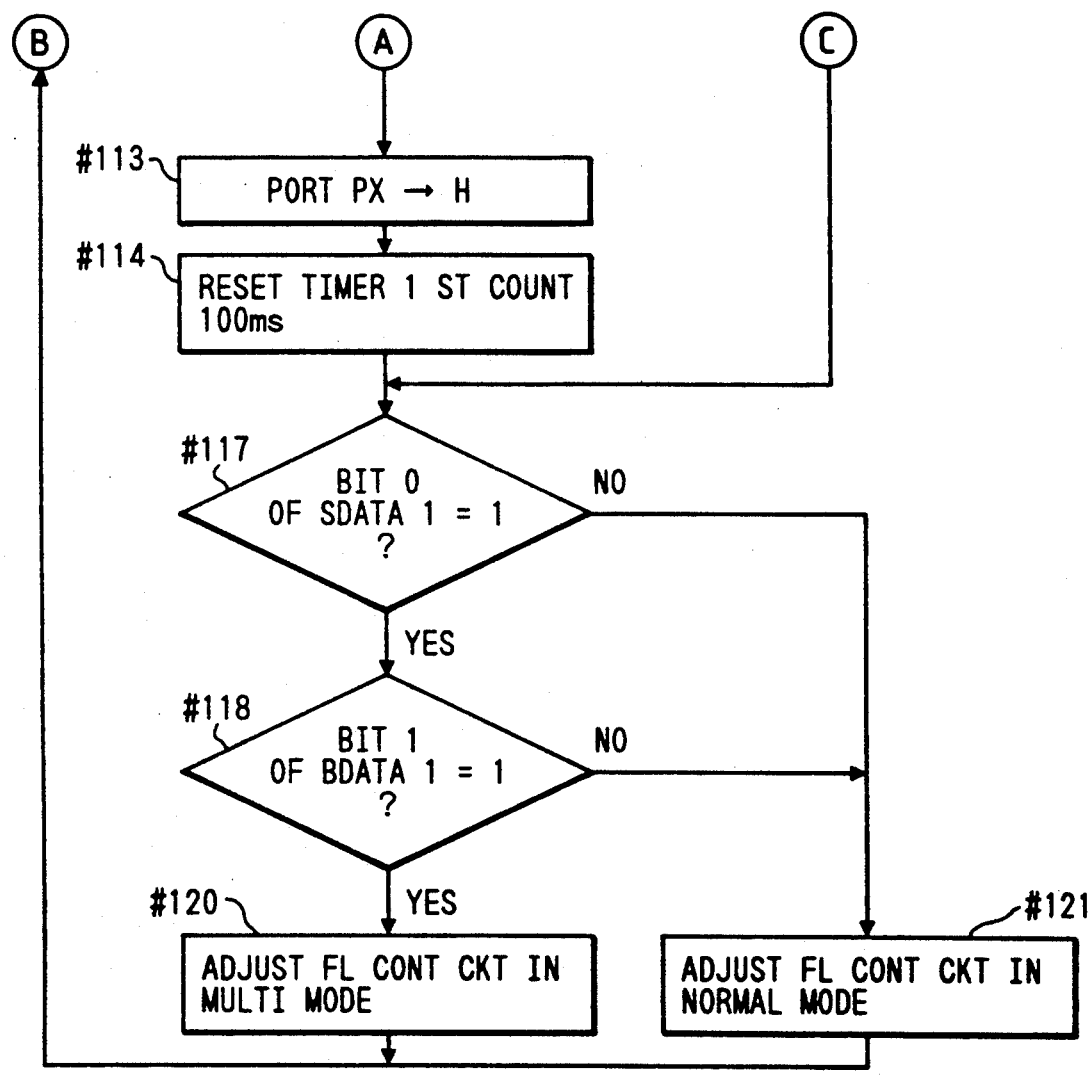

TTL AUTOMATIC LIGHT CONTROLLING CAMERA SYSTEM

This is a continuation of application Ser. No. 884,890 filed May 18, 1992, which is a continuation of application Ser. No. 678,212 filed Apr. 1, 1991, both of which are now abandoned.

BACKGROUND OF THE INVENTION

1. Field of the Invention

The present invention relates to a TTL automatic light controlling camera system, a camera body and a flashing device, the TTL automatic light controlling camera system being constituted by combining a camera body and a flashing device.

2. Related Background Art

Hitherto, camera systems capable of controlling light by a TTL method have been arranged in such a manner that one light receiving element is included in the camera body at a position at which it confronts the entire surface or an essential portion of a film. Furthermore, a shutter disposed between the film surface and the light receiving element is completely opened before a flashing device commences to emit light. Light of the subject field reflected from the surface of the film is photoelectrically converted by the light receiving element. Then, a signal corresponding to the quantity of the integrated quantity of light is subjected to a comparison with a predetermined value. As a result, the quantity of light emitted from the flashing device is controlled so as to obtain a predetermined brightness on the surface of the film. However, the above-described system cannot satisfactorily control light in various states of the subject field because the region of the subject field which can be detected is a one-dimensional region. Therefore, a problem arises in that exposure of the essential subject field desired by the photographer cannot be obtained. Accordingly, various structures have been developed recently for the purpose of overcoming the above-described problems.

For example, a system has been disclosed in U.S. Ser. No. 560,745 in which the idea of a so-called multi-pattern photometry is adapted to the TTL automatic light control system. According to this disclosure, a plurality of photoelectrically converting means capable of measuring light of the subject field by dividing the field into a plurality of regions are disposed to confront the surface of a film. Furthermore, the flashing device is caused to pre-emit (previously emit) light immediately before a focal plane shutter disposed between the surface of the film and the plurality of the photoelectrically converting means is opened. The plurality of the photoelectrically converting means receive light of the subject image due to the previous light emission and reflected by the surface of the shutter. The outputs from the plurality of the photoelectrically converting means are respectively integrated so as to be detected as the distribution of light reflected by the plurality of the regions of the subject field due to the flash light. Information about the detected distribution of light reflected by the plurality of the regions of the subject field is arithmetically processed in accordance with a predetermined multipattern algorithm. As a result, the degree of weighting the plurality of the regions is determined so as to obtain the most suitable exposure for the essential subject. Subsequently, the flashing device is caused to intrinsically emit light immediately after the shutter has been opened. Light reflected from the surface of the film is, similarly to the above-described previous light emission, received by the plurality of the photoelectrically converting means. The outputs from the photoelectrically converting means are subject to the weighting operation the degree of which has been determined as described above before they are added and integrated. The result of the integration is subjected to a comparison with a predetermined value. As a result, timing at which the light emission operation performed by the flashing device is stopped is determined, the timing being used to determine the quantity of light emitted. The above-described TTL light controlling method, that is, the TTL light control system in which the pre-emission operation is performed is hereinafter called a "TTL multicontrol", while a TTL light control system in which no pre-emission operation is hereinafter called a "TTL normal light control".

When the TTL multicontrol structure disclosed in U.S. Ser. No. 560,745 is adapted to an actual camera system, both the camera body and the flashing device must have novel functions respectively. That is, the camera body must have a photoelectrically converting means capable of performing the partitive photometry and an output signal processing circuit, a sequence control means and the like. The flashing device must have a means capable of quickly repeating the pre-emission operation and the intrinsic emission operation and as well as controlling the quantity of light emitted in such a manner that the maximum quantity of light emitted at the pre-emission operation is restricted for the purpose of maintaining the quantity of light which can be emitted at the intrinsic emission operation. Furthermore, it is preferable that a common contact be used to pass both the emission start signals and the emission stop signals for use in the pre-emission operation and the intrinsic emission operation.

However, the camera body and the flashing device having the above-described functions can, in actuality, be coupled to conventional structures respectively. Therefore, it is necessary to satisfactorily realize the functions, which have heretofore been realized, in the above-described adaptation. For example, if the camera body having the novel functions and a conventional type flashing device are coupled to each other, the conventional TTL normal light control can be performed in response to the first light emission signal while neglecting the pre-emission operation. On the contrary, if the conventional type camera body and the flashing device having the novel functions are coupled to each other, the flashing device must not recognize the emission start signal which is transmitted in the shutter releasing operation, as the pre-emission light.

SUMMARY OF THE INVENTION

An object of the present invention is to provide a camera in which a TTL normal light control mode and a TTL multicontrol mode can be switched over and which performs the TTL multicontrol when it detects a fact that a flashing device capable of performing the TTL multicontrol is mounted on a camera body.

Another object of the present invention is to provide a flashing device capable of selecting a first light control mode in which light emission is stopped in response to a light emission stop signal supplied from a camera body and a second light control mode in which the quantity of light is determined by the flashing device when the flashing device is mounted on the camera body which is capable of performing a TTL multicontrol.

A further object of the present invention is to provide a camera operable appropriately in a TTL normal light control mode or a TTL multicontrol mode, dependent upon the type of flashing device mounted on the camera body, and dependent on operating modes set by the camera body and the flashing device.

Another object of the invention is to provide a flashing device operable appropriately in different light emission modes, dependent upon the type of camera body on which the flashing device is mounted, and dependent on operating modes set by the camera body and the flashing device.

In accordance with the invention, in a camera system comprising a flashing device operable in a TTL multicontrol mode and a camera body operable in a TTL multicontrol mode or a TTL normal light control mode selectively, a TTL multicontrol circuit of the camera is energized when the flashing device outputs a signal to the camera body indicating operability in the TTL multicontrol mode.

In a camera system comprising a flashing device operable in a TTL normal light control mode, but not capable of operating in a TTL multicontrol mode, and a camera body operable in either mode selectively, the system is forced to operate in the TTL normal light control mode, even if the TTL multicontrol mode is selected at the camera body.

In a camera system comprising a flashing device operable in a TTL multicontrol mode or in a TTL normal light control mode selectively, and a camera body operable in a TTL normal light control mode, but not capable of operating in a TTL multicontrol mode, the system is forced to operate in the TTL normal light control mode even if the TTL multicontrol mode is selected at the flashing device.

In a camera system comprising a flashing device operable in a TTL multicontrol mode or a TTL normal light control mode selectively, and a camera body operable only in the TTL multicontrol mode, the camera body controls the stopping of light emission by the flashing device on the basis of only main light emitted by the flashing device when the TTL normal light control mode is selected at the flashing device.

Another object of the present invention is to provide a camera system comprising the above-described camera and the flashing device.

According to one aspect of the present invention, there is provided a TTL automatic light controlling camera system including a camera body capable of performing a TTL multicontrol and a flashing device capable of successively performing a previous light emission and a intrinsic light emission in response to a command issued from the camera body, the TTL automatic light controlling camera system being arranged in such a manner that:

TTL light control mode switching means capable of switching a TTL multicontrol mode and a TTL normal light control mode is disposed in the camera body; light control mode switching means capable of switching a first light control mode in which the quantity of light emitted is determined in response to a light emission stop signal supplied from the camera body and a second light control mode in which the quantity of light emitted is determined by the light control mode switching means is disposed in the flashing device; information about the result of the selection made by the TTL light control mode switching means is transmitted from the camera body to the flashing device; information about the result of the selection of the light control mode switching means is transmitted from the flashing device to the camera body; the TTL multicontrol is performed only when the TTL multicontrol mode and the first light control mode are selected by a TTL light control means disposed in the camera body; the TTL normal light control is performed when the TTL normal light control mode is selected and as well as the first light control mode is selected; the TTL normal light control is performed if a flashing device which cannot previously emit light is mounted although the TTL multicontrol mode is selected; light emission control means disposed in the flashing device controls the light emission in such a manner that the previous light emission and the intrinsic light emission are successively performed only when the TTL multicontrol mode is selected and as well as the first light control mode is selected.

According to another aspect of the present invention, there is provided a camera body capable of performing a TTL multicontrol and arranged in such a manner that:

TTL light control mode switching means capable of switching a TTL multicontrol mode and a TTL normal light control mode and detection means for detecting whether or not a mounted flashing device is capable of acting in synchronization with the TTL multicontrol are disposed so that only when the TTL multicontrol mode is selected and as well as a fact that the flashing device capable of acting in synchronization with the TTL multicontrol is mounted is detected, the TTL multicontrol is performed; when the TTL normal light control mode is selected, the TTL normal light control is performed regardless of the type of the mounted flashing device; and the TTL normal light control is performed in a case where the flashing device which cannot previously emit light in synchronization with the TTL multicontrol is mounted even if the TTL multicontrol mode is selected.

According to another aspect of the present invention, there is provided a flashing device capable of successively performing a previous light emission and an intrinsic light emission in response to a command issued from a camera body in a case where it is mounted on said camera body which is capable of performing a TTL multicontrol, the flashing device comprising:

light control mode switching means capable of switching a first light control mode in which the quantity of the light emission is determined in response to a light emission stop signal supplied from the camera body and a second light control mode in which the flashing device determines the quantity of the light emission; and detection means for detecting whether or not the mounted camera body performs the TTL multicontrol, whereby, only when the first light control mode is selected and as well as a fact that mounting on the camera body which performs the TTL multicontrol is detected, the light emission is controlled in such a manner that the previous light emission and the intrinsic light emission are successively performed and only the intrinsic light emission is performed in the other cases.

According to another aspect of the present invention, there is provided a camera body capable of performing a TTL multicontrol, the camera body comprising: TTL light control mode switching means capable of switching a TTL multicontrol mode and a TTL normal light control mode; first detection means for detecting whether or not a mounted flashing device is capable of acting in synchronization with the TTL multicontrol; and second detection means for detecting whether or not a charge completion signal, which is transmitted when an operation for raising the voltage of the mounted flashing device has been completed, is present, whereby, only when the TTL multicontrol mode is selected, mounting of the flashing device capable of acting in synchronization with the TTL multicontrol is detected and the charge completion signal is detected, the TTL multicontrol is performed.

According to another aspect of the present invention, there is provided a flashing device capable of successively performing a previous light emission and an intrinsic light emission in a case where it is mounted on a camera body which is capable of performing a TTL multicontrol, the flashing device comprising:

light control mode switching means capable of switching a first light control mode in which the quantity of light emission is determined in response to a light emission stop signal supplied from the mounted camera body and a second light control mode in which the flashing device determines the quantity of the light emission; charge completion signal output means for transmitting a charge completion signal when it detects the completion of a voltage raising operation; and detection means for detecting whether or not the mounted camera body performs the TTL multicontrol, whereby, only when the charge completion signal is transmitted, the first light control mode is selected and mounting of the camera body capable of performing the TTL multicontrol is detected, the light emission is controlled in such a manner that the previous light emission and the intrinsic light emission are successively performed and only the intrinsic light emission is performed in the other cases.

According to another aspect of the present invention, there is provided a TTL automatic light controlling camera system including a camera body capable of performing a TTL multicontrol and a flashing device capable of successively performing a previous light emission and an intrinsic light emission in response to a command issued from the camera body, the TTL automatic light controlling camera system being arranged in such a manner that:

a TTL light control mode switching means capable of switching the TTL multicontrol mode and a TTL normal light control mode is disposed in the flashing device; information about the result of the selection made by the TTL light control mode switching means is transmitted from the flashing device to the camera body; and a multicontrollable signal informing that the TTL multicontrol can be performed is transmitted from the camera body to the flashing device, whereby a light emission control means disposed in the flashing device performs a control operation in such a manner that, when the TTL multicontrol mode is selected and the multicontrollable signal is received, a previous light emission and an intrinsic light emission are successively performed and the intrinsic light emission is performed in the other cases.

According to another aspect of the present invention, there is provided a flashing device capable of successively performing a previous light emission and an intrinsic light emission in response to a command issued from a camera body when it is mounted on the camera which is capable of performing the TTL multicontrol, the flashing device comprising:

TTL light control mode switching means capable of switching a TTL multicontrol mode and a TTL normal light control mode; transmission means for transmitting information about the selection made by the TTL light control mode switching means to the mounted camera body; and detection means for detecting whether or not the mounted camera body performs the TTL multicontrol, whereby, only when the TTL multicontrol mode is selected and mounting of the camera body which performs the TTL multicontrol is detected, the light emission is controlled in such a manner that the previous light emission and the intrinsic light emission are successively performed and only the intrinsic light emission is performed in the other cases.

According to another aspect of the present invention, there is provided a camera body capable of performing a TTL multicontrol, the camera body comprising:

detection means for detecting whether or not a mounted flashing device has selected a TTL multicontrol mode, whereby, only when the detection means has selected the TTL multicontrol mode, the TTL multicontrol is performed and the TTL normal light control is performed in the other cases.

Therefore, according to the present invention, when the TTL multicontrol mode is selected in the camera body and the first light control mode is selected in the flashing device, the TTL multicontrol is performed.

In a case where a flashing device (a conventional flashing device), which cannot perform the previous light emission in synchronization with the TTL normal light control, is mounted on the camera body, the TTL normal light control is performed even if the TTL multicontrol mode has been selected. In a case where the flashing device according to the present invention is mounted on a camera body (a conventional camera body) which cannot perform the TTL multicontrol, the light control operation is performed in such a manner that only the intrinsic light emission is performed.

In the camera body according to the present invention, when the TTL multicontrol mode is selected the TTL multicontrol, it is performed in a case where a flashing device which acts in synchronization with the TTL multicontrol is mounted. On the other hand, when the TTL normal light control mode is selected, the TTL normal light control is performed even if the flashing device which acts in synchronization with the TTL multicontrol is mounted. In a case where a flashing device (a conventional flashing device) which cannot perform the previous light emission in synchronization with the TTL normal light control is mounted on the camera body according to the present invention, the TTL normal light control is performed even if the TTL multicontrol mode has been selected.

In the flashing device according to the present invention, when the first light control mode is selected, the light control operation is performed in such a manner that the previous light emission and the intrinsic light emission are successively performed in a case where it is mounted on a camera body which performs the TTL multicontrol. On the contrary, when the second light control mode is selected, or it is mounted on a camera body (a conventional camera body) which cannot perform the TTL multicontrol, the light emission control is performed in such a manner that only the intrinsic light emission is performed.

In the camera body according to the present invention, the TTL multicontrol is not performed but the TTL normal light control is performed if the completion of the operation for raising the voltage of the flashing device is not completed although the TTL multicontrol mode is selected in a case where the flashing device capable of acting in synchronization with the TTL multicontrol.

In the flashing device according to the present invention, the light emission control is performed in such a manner that the previous light emission and the intrinsic light emission are not successively performed but only the intrinsic light emission is performed if the operation for raising the voltage of the flashing device has not been completed although the first light control mode is selected in a state where it is mounted on the camera body which performs the TTL multicontrol.

In the TTL automatic light controlling camera system according to the present invention, when the TTL multicontrol mode is selected in the flashing device, the light control operation is performed in such a manner that the previous light emission and the intrinsic light emission are successively performed provided that the multicontrollable signal supplied from the camera body has been received. On the other hand, when the TTL normal light control mode is selected in the flashing device, the light control operation is performed in such a manner that only the intrinsic light emission is performed.

In the flashing device according to the present invention, when the TTL multicontrol mode is selected, the light control operation is performed in such a manner that the previous light emission and the intrinsic light emission are successively performed in a case where it is mounted on a camera which performs the TTL multicontrol. On the other hand, when the TTL normal light control mode is selected, the light control operation is performed in such a manner that only the intrinsic light emission is performed in a case where it is mounted on a camera body (a conventional camera body) which cannot perform the TTL multicontrol.

In the camera body according to the present invention, when the mounted flashing device has selected the TTL multicontrol mode, the TTL multicontrol is performed. On the other hand, if the mounted flashing device has selected the TTL normal light control mode, or if the flashing device (a conventional flashing device) which cannot perform the previous light emission is mounted, the TTL normal light control is performed.

Other and further objects, features and advantages of the invention will be appear more fully from the following description.

BRIEF DESCRIPTION OF THE DRAWINGS

FIG. 15 is a flow chart which illustrates the operation of a microcomputer included in a flashing device in the TTL automatic light controlling camera system shown in FIG. 1B.

DETAILED DESCRIPTION OF THE PREFERRED EMBODIMENT

Preferred embodiments of a TTL automatic light controlling camera system, a camera body and a flashing device will now be described.

Figure 2:
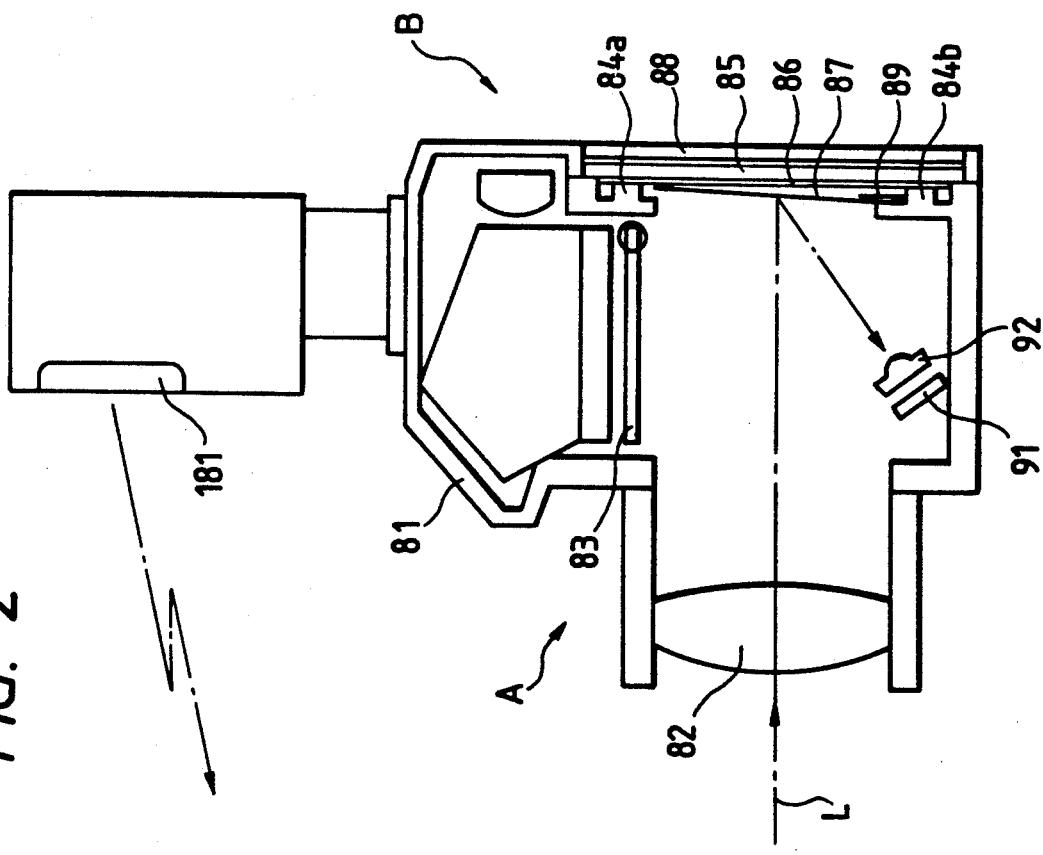
FIG. 2 is a cross sectional view which illustrates the optical configuration of optical converting means of the TTL automatic light controlling camera system.

FIG. 2 is a cross sectional view which illustrates the configuration of the optical elements of a photoelectrically converting means according to the embodiment of the present invention, where a state is illustrated in which a flashing device 181 is mounted on a camera body 81. In the camera body 81, a film 86 is fixed by inner rails 84a, 84b and a pressing plate 85 at a position at which a beam is imaged which has passed through an imaging lens 82 in a state where a movable mirror 83 has been retracted as shown in FIG. 2. The front curtain 87 of a focal plane shutter is placed in front of the film 86 so that the exposure of the film 86 is prohibited in cases except for the case in which a subject is photographed. During the exposure operation, that is, when the shutter front curtain 87 is retracted, beam L transmitted from the subject is refracted by the imaging lens 82 before it is imaged on the surface of the film 86. A portion of the beam L reaches a converging lens 92 and a photoelectrically converting means 91. When the film 86 is not exposed to light, that is, when the shutter front curtain 87 is positioned as shown in FIG. 2, the beam L transmitted from the subject is refracted by the imaging lens 82 before it is substantially imaged on the surface of the shutter front curtain 87. A portion of the beam L is reflected so that it also reaches the converging lens 92 and the photoelectrically converting means 91. Reference numeral 89 represents a rear curtain of focal plane shutter.

Figure 4:
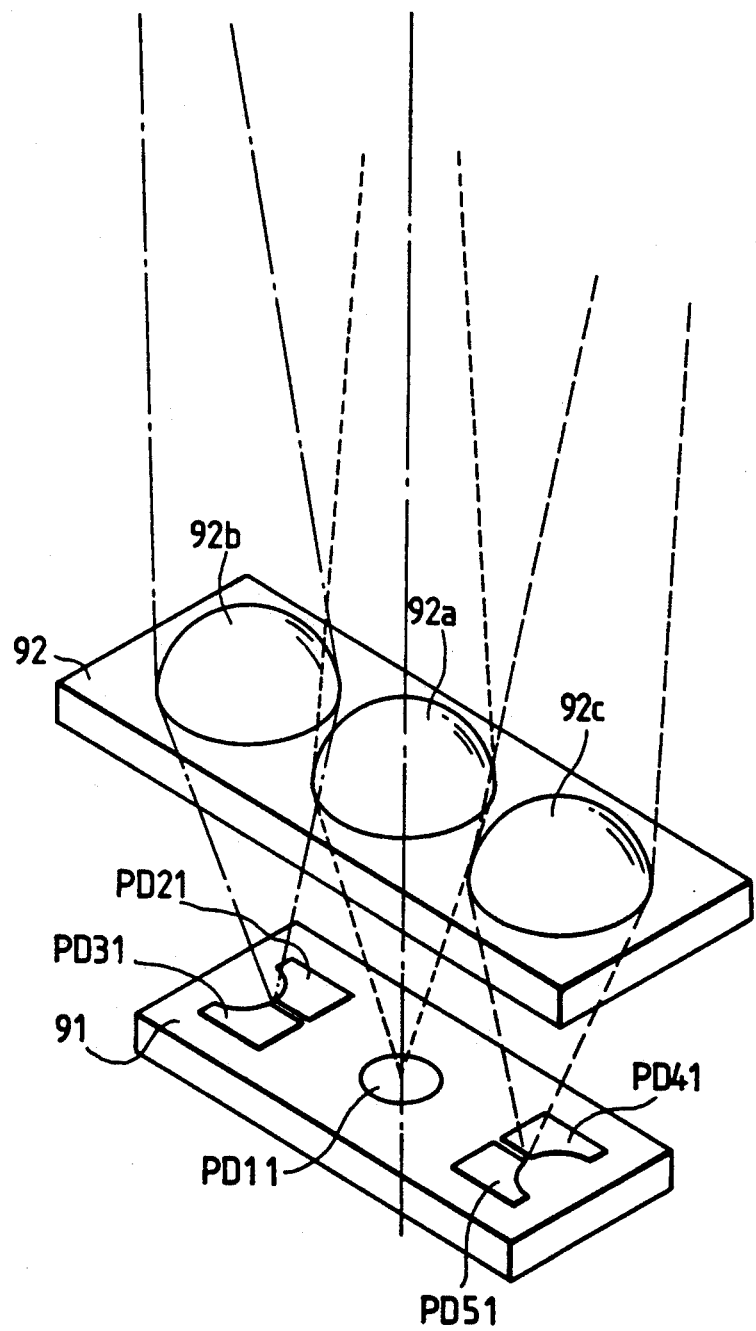
FIG. 4 is a perspective view which illustrates the relationship shown in FIG. 3.

FIG. 4 illustrates the structure of the photoelectrically converting means 91 and the converging lens 92.

The photoelectrically converting means 91 comprises, on the same plane thereof, a circular light receiving region PD11, light receiving regions PD21, PD31, PD41 and PD51 each of which is formed by cutting a rectangle with a circular arc. The converging lens 92 is an optical element comprising three lens portions 92a, 92b and 92c disposed above and to correspond to the three blocks of the light receiving regions.

Figure 3:
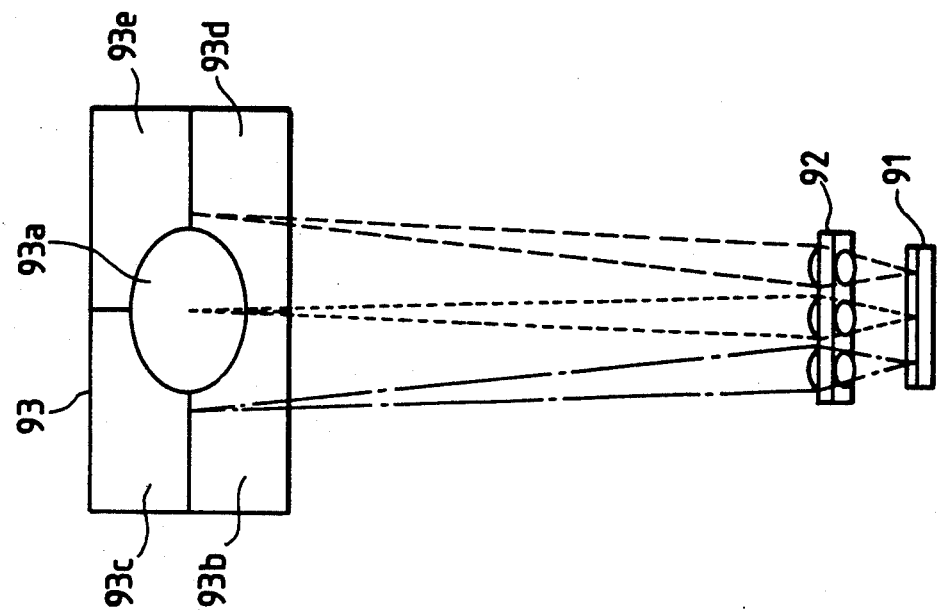
FIG. 3 illustrates the optical relationship between the optical converting means and the film surface.

FIG. 3 is a view which illustrates the optical positional relationship between an opening region 93 of the film surface, the photoelectrically converting means 91 and the converging lens 92 when viewed from a direction designated by an arrow A of FIG. 2. An assumption is made that the opening region 93 of the film surface is divided into five regions, a central circular portion 93a and four rectangular portions 93b, 93c, 93d and 93e formed by dividing the portion surrounding the central circular portion 93a. In this state, the central portion, the right portion and the left portion consisting of the five light receiving regions of the photoelectric converting means 91 shown in FIG. 4 confront the central portion, the left half portion and the right half portion of the opening portion of the film surface via the three lens portions of the converging lens 92 as respectively designated by short dashes lines, alternate long and short dashes lines and long short dashes lines. Furthermore, they are substantially completely imaged. In addition, the shapes of the five light receiving regions PD11, PD21, PD31, PD41 and PD51 of the photoelectrically converting means 91 shown in FIG. 4 are the same as those of the regions 93a, 93b, 93c, 93d and 93e of the opening portion of the film surface shown in FIG. 3. Therefore, a photoelectrically converting means capable of partitively measuring the brightness of the five regions is realized.

Figure 1A:
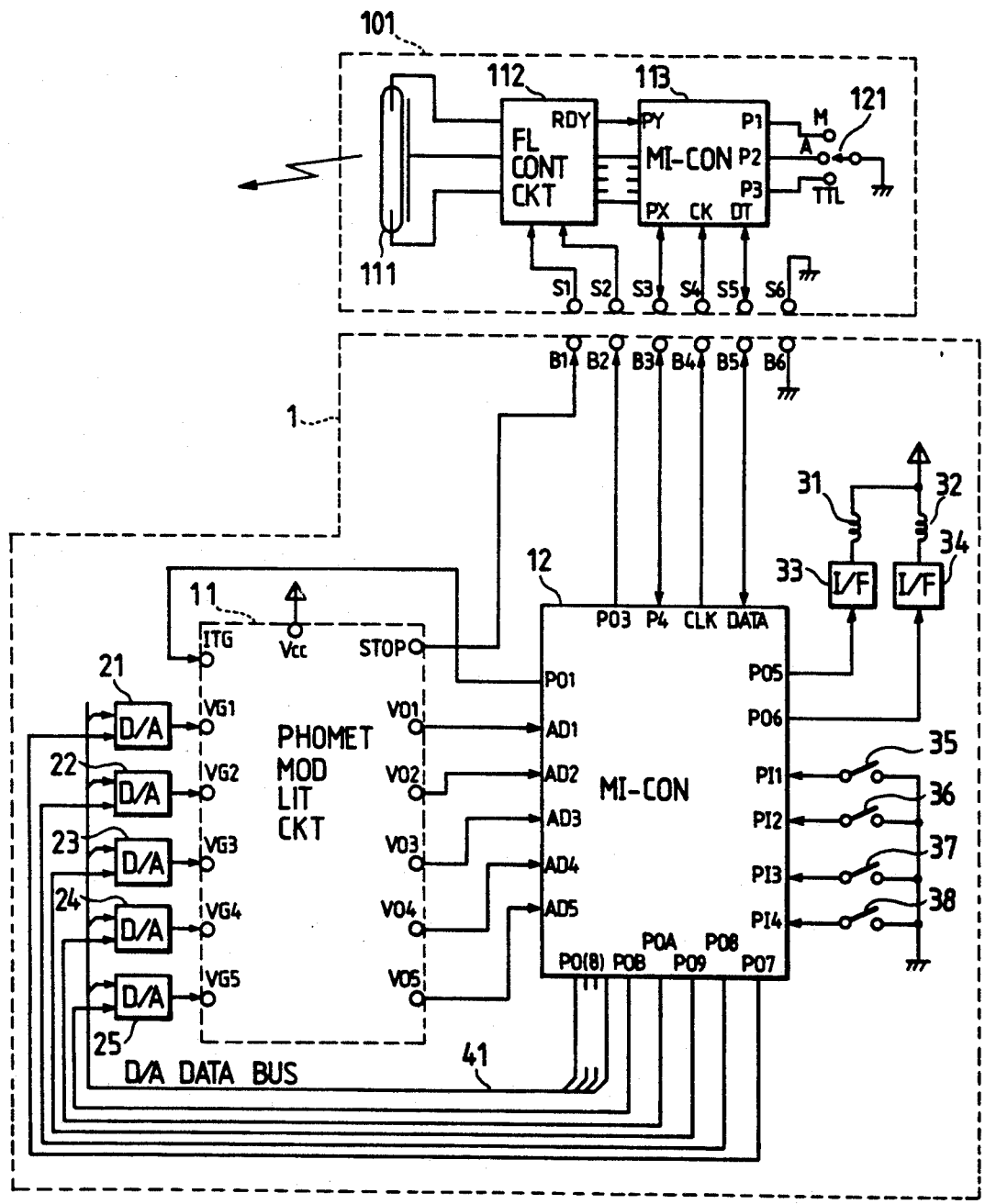
FIGS. 1A and 1B are block circuit diagrams which illustrate first and second embodiments of a TTL automatic light controlling camera system according to the present invention.

FIG. 1A is a block diagram which illustrates the structure of a circuit for use in an embodiment of a TTL automatic light controlling camera system according to the present invention.

The TTL automatic light controlling camera system according to the present invention comprises a camera body 1 and a flashing device 101 which can be electrically connected to each other via corresponding contacts B1 to B6 and S1 to S6. The contacts B6 and S6 are GND connecting terminals.

The flashing device 101 comprises a light emitting portion 111, an emission control circuit 112 and a microcomputer 113. The emission control circuit 112 includes a voltage raising circuit, a main capacitor, an emission control SCR and the like. The emission control circuit 112 intrinsically acts to receive an emission start signal supplied through the contact S2 and an emission stop signal supplied through the contact S1 so as to control the start and stop of the emission of light from the light emitting portion 111. The contacts S3, S4 and S5 are directly connected to the microcomputer 113 at its input port PX, a clock input terminal CK and a data I/O terminal DT. As a result, the flashing device 101 is able to perform a serial data communication with the camera body 1. Furthermore, three signal lines from a light control mode switch 121 are connected to the input ports P1 to P3 of the microcomputer 113. The light control mode switch 121 is a switch which acts in synchronization with the action of an operation member with which a photographer selects a mode of the flashing device 101 from the TTL light control mode (TTL) having both the TTL multicontrol function and the TTL normal light control function, an external control mode (A) and a manual emission (full emission) mode (M), that is, the method of controlling light is selected. Furthermore, the microcomputer 113 receives a charge completion signal supplied through an RDY terminal of the emission control circuit 112 via the input port PY, the charge completion signal denoting whether or not the voltage level of the main capacitor charged due to the voltage raising operation is sufficiently high to maintain a predetermined quantity of light to be emitted. In addition, the microcomputer 113 is electrically connected to the emission control circuit 112 so as to change the method of controlling the light emission in accordance with the light control mode which has been set by the photographer.

The camera body 1 mainly comprises a photometry/light-control circuit 11 and a microcomputer 12.

Figure 5:
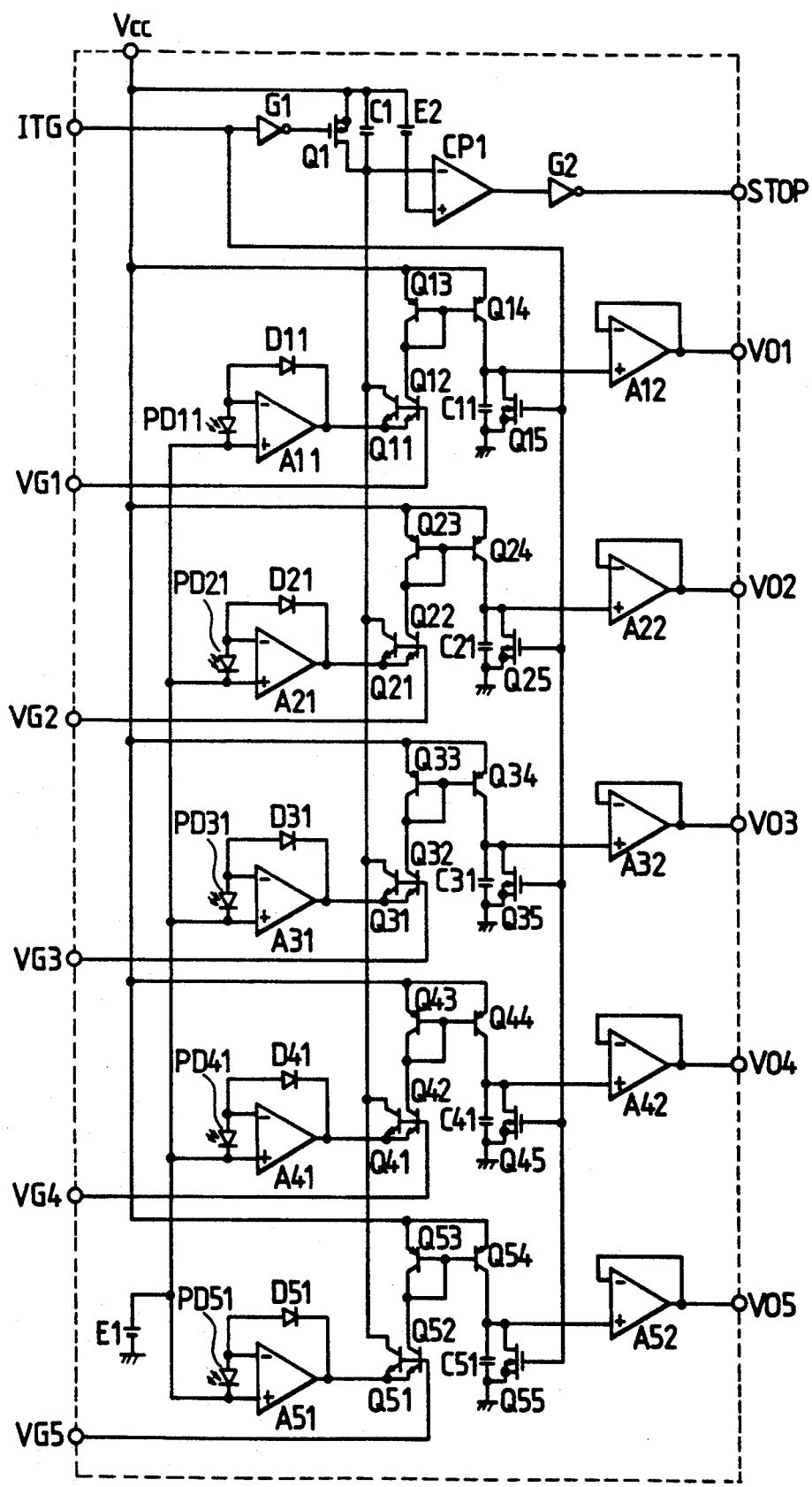
FIG. 5 illustrates the internal structure of a photometric/light controlling circuit shown in FIGS. 1A and 1B.

First, the photometry/light-control circuit 11 will now be described with reference to FIG. 5 which illustrates its internal circuit. Reference numerals PD11 to PD51 represent photodiodes serving as photoelectrically converting means divided into five regions also shown in FIG. 4, the photodiodes PD11 to PD51 respectively emitting photoelectric currents which are in proportion to the illumination intensities. The photoelectric current emitted from the photodiode PD11 is logarithmically compressed by an OP amplifier A11 to which the photodiode PD11 is fed back, the photoelectric current being thus converted into a voltage output which is determined in accordance with reference power source E1. Each of transistors Q11 and Q12 is arranged in such a manner that the above-described voltage level is used as its emitter potential and input voltage from a gain setting input terminal VG1 is used as its base potential. The transistors Q11 and Q12 emit collector currents which have been logarithmically elongated with the gain determined in accordance with the potential difference. The collector current emitted from the transistor Q12 is reversed by the current mirror circuits of the transistors Q13 and Q14 so as to charge a capacitor C11. The voltage charged in the capacitor C11 is, via a follower amplifier A12, transmitted to an integrated voltage output terminal VO1. An FET Q15 receives a signal supplied through the integration control signal input terminal ITG so that it discharges overall charge accumulated in the capacitor C11. The above-described operations are commonly performed in the other photometric circuits in which the terminals VO2 to VO5 serve as the outputs. On the other hand, the collector currents emitted from the transistors Q11 to Q51 are added so as to charge a capacitor C1. The voltage charge in the capacitor C1 is subjected to a comparison with reference voltage E2 by a comparator CP1. The output from the comparator CP1 is reversed from L to H when the relationship is reversed, and an output terminal STOP is changed from H to L. An FET Q1 receives a signal supplied through the integration control signal input terminal ITG so that the overall charge accumulated in the capacitor C1 is discharged.

The microcomputer 12 will now be described. The microcomputer 12 transmits selection signals from its five output ports PO7 to POB while transmitting, via a data bus 41, data to D/A converters 21 to 25 from its 8-bit output PO(8), so that individual voltage levels are set to the D/A converters 21 to 25. An output voltage from each of the D/A converters 21 to 25 are received by gain setting input terminals VG1 to VG5 of the photometric/light-controlling circuit 11. Five integrated voltage output terminals VO1 to VO5 of the photometric/light-controlling circuit 11 are respectively connected to A/D converting input terminals AD1 to AD5 of the microcomputer 12. The output port PO1 is connected to the integration control signal input terminal ITG. Reference numerals 35 and 36 are mechanical switches which act in accordance with an operative sequence of the camera. Reference numeral 35 represents a mirror-up switch which is switched on when a mirror-up operation has been completed. Reference numeral 36 represents a synchronizing switch which is switched on when the shutter has been fully opened. Reference numerals 37 and 38 represent switches which act in synchronization with the action of an operating means which is operated by a photographer. Reference numeral 37 represents a release starting switch which is switched on when a shutter release button is depressed. Reference numeral 38 represents a light-control mode selection switch for selecting the method of controlling the TTL light control mode from the TTL multicontrol mode and a TTL normal light control mode. The signals from the above-described four switches are respectively supplied to input ports P11 to P14 with a pull-up resistor of the microcomputer 12. Reference numerals 31 and 32 are magnets for holding the front curtain 87 and the rear curtain 89. Signals from the output ports PO5 and PO6 of the microcomputer 12 are supplied to the magnets 31 and 32 via interfaces 33 and 34 so that their operations are controlled. The emission stop signal supplied through the STOP terminal of the photometric/light-controlling circuit 11 is transmitted to the emission control circuit 112 of the flashing device 101 via a contact B1 disposed between the STOP terminal and the flashing device 101. The emission start signal is supplied through the output port PO3 of the microcomputer 12 to the flashing device 101 via a contact B2. The camera body 1 and the flashing device 101 perform the serial data communication via contacts B3 to B5 which are respectively connected to the output terminal P4, a clock output terminal CLK, a serial data I/O terminal DATA of the microcomputer 12.

The operation of the thus constituted TTL automatic light controlling camera system will now be described.

Figure 6:
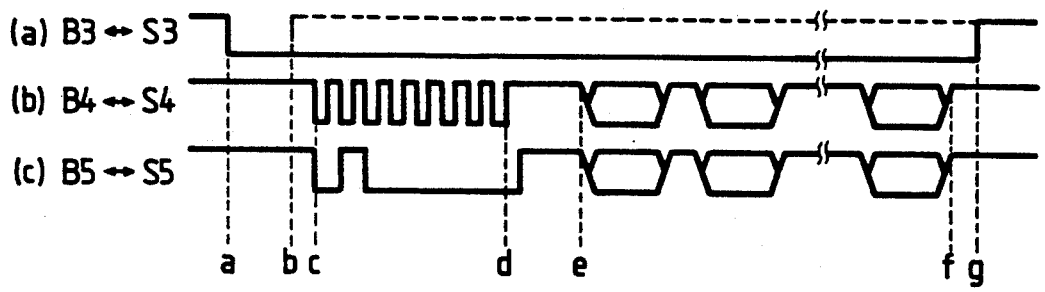
FIG. 6 is a timing chart for a data communicating operation performed in the TTL automatic light controlling camera system shown in FIG. 1A.

First, the serial data communication performed between the microcomputer 12 of the camera body 1 and the microcomputer 113 of the flashing device 101 via the contacts B3 to B5 and S3 to S5 will be described with reference with a timing chart shown in FIG. 6.

The camera body 1 usually transmits high level signals to the contact B3 while making the I/O port P4 of the microcomputer 12 to be an output state. When the data communication with the flashing device 101 is performed, the camera body transmits a low level signal to the terminal of the flashing device 101 (at point a shown in FIG. 6A). After a predetermined time has elapsed (at point b), the microcomputer 12 switches the I/O port P4 to an input state with a pull-up resistor so as to determine the level of the contact B3. On the other hand, the flashing device 101 makes the I/O port PX of the microcomputer 113 into an input state so as to always check the level of the contact S3. If the flashing device 101 detects the low level, it switches the I/O port PX to an output state from that point so as to transmit a low level signal. If the level of the contact B3 at point b is low, the camera body 1 determines that the flashing device 101 capable of performing the data communication has been mounted and it starts the serial data communication. If the level of the contact B3 is high at point b, the camera body 1 determines that the flashing device 101 capable of performing the data communication has not been mounted and it stops the communicating action at that point. In a case where the communicating action is started, the camera body 1 transmits first data through the contact B5 in synchronization with the clock supplied through the contact B4 at point c. When data for 8-bit has been transmitted at point d, the camera body 1 stops the transmission of the first data. Then, transmission of data items of a predetermined number from the camera body 1 and receipt of the data from the flashing device 101 are performed at predetermined intervals. The camera body 1 and the flashing device 101 respectively recognize the one time of the data communication when the transmission and the receipt of data of the predetermined number have been completed at the point (point f). The flashing device 101 stops the transmission of the L level signals through the contact S3 at point g and makes the I/O port PX to be an input state.

Figure 7:
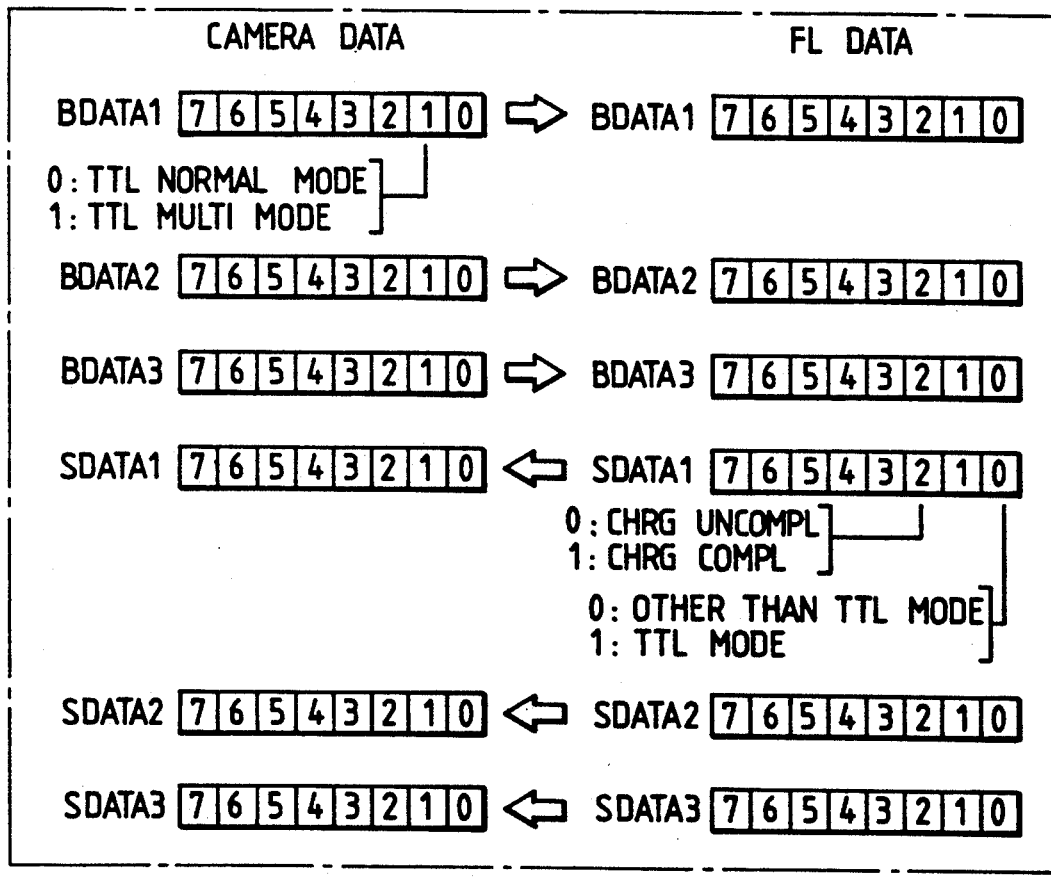
FIG. 7 illustrates the bit map of data to be communicated in the TTL automatic light controlling camera system shown in FIG. 1A.

Assuming that the numbers of the data items transmitted/received between the camera body 1 and the flashing device 101 are, for example, 3 bytes respectively, the data communication is performed as shown in FIG. 7. Referring to FIG. 7, data items transmitted from the camera body 1 to the flashing device 101 are called BDATA 1 to BDATA 3 and data items transmitted from the flashing device 101 to the camera body 1 are called SDATA 1 to SDATA 3. The contents of the data are various information set in the same. Bit 1 of BDATA 1 is arranged to be information about the control method of the TTL light control set in the camera body 1. If the above-described bit is 1, the fact that the TTL multicontrol mode has been set is informed to the flashing device 101. If the same is 0, the fact that the TTL normal light control mode is informed to the flashing device 101. Furthermore, bit 0 of SDATA 1 is arranged to be information for about the control method set in the flashing device 101. If the above-described bit is 1, the fact that the TTL control mode, that is the mode in which the quantity of light is determined in response to the emission stop signal supplied from the camera body has been set is informed to the camera body 1. If the same is 0, the fact that the other modes, that is the exterior control mode in which the flashing device 101 determines the quantity of light to be emitted or the manual emission mode (full emission) mode has been set is informed to the camera body 1. Furthermore, bit 2 of SDATA 1 is arranged to be information about a fact whether or not the voltage level charged in the main capacitor in the emission control circuit of the flashing device 101 is higher than a predetermined level. That is, it is arranged to be information about a fact that the voltage raising operation of the flashing device 101 has been completed. If the above-described bit is 1, a fact that the charging operation has been completed is informed to the camera body 1. If it is 0, a fact that the charging operation has not been completed is informed to the camera body 1.

General operations except for the data communicating operation will now be described with reference to a timing chart shown in FIG. 8 and flow charts shown in FIGS. 9A and 9B.

First, the normal operation except for the shutter release operation is performed in such a manner that the microcomputer 12 of the camera body 1 commences the execution of a program when power is supplied. As a result, the microcomputer 12 determines the state of the switch 38 in #1 shown in FIG. 9A. If the switch 38 is switched off, the bit 1 of the memory BDATA 1 is cleared. If the same is switched on, the above-described bit is set in #3 in which the mode selected from the TTL multicontrol mode or the TTL normal light control mode is detected as the method of TTL control operation of the camera body 1, the detected mode being then stored as a flag. Then, in #4, an attempt of the serial data communication with the flashing device 101 is made. If the communication can be established, data received in #6 is stored in the memories SDATA 1 to SDATA 3. If the communication cannot be established due to the fact that no response was detected, for example, in a case where the subject flashing device has the TTL controlling function but is a conventional type device which cannot be adapted to the TTL multicontrol system, 0 is stored in all of the bits of the SDATA 1 to 3 in #7. Then, the state of the switch 37, that is, the state of the release start switch 37 is determined in #8. If the switch 37 is switched off, the flow returns to #1. If the same is switched on, the flow advances to a release routine in #9. When the release routine is ended, the flow returns to #1 and thus the basic loop is formed. Referring to FIG. 8, the release start switch 37 is switched on at point a shown in FIG. 8A. This fact is detected in #8 of the flow chart, and then the release operation is started at point b.

Figure 8:
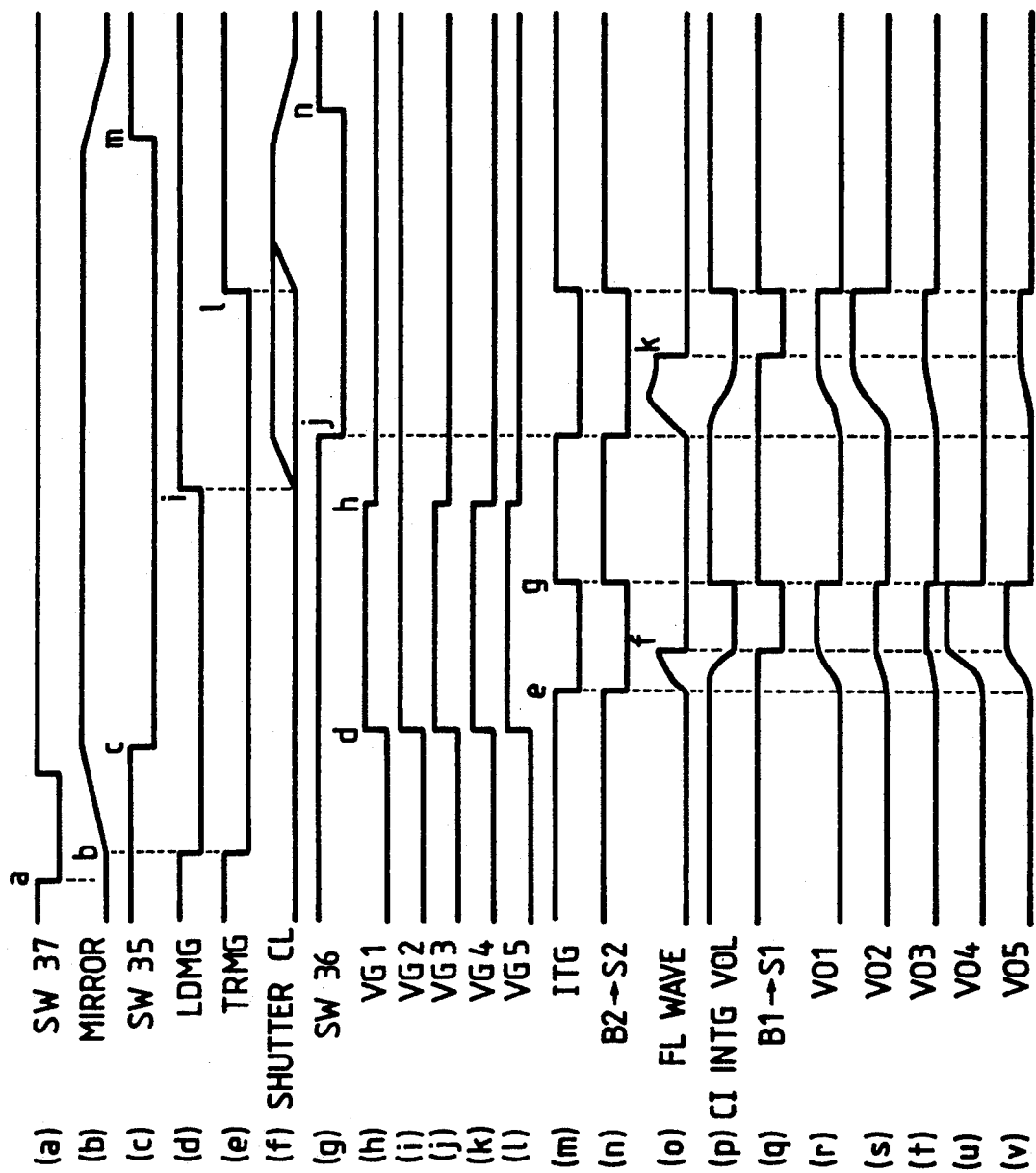
FIG. 8 is a timing chart for a release operation performed in the TTL automatic light controlling camera system shown in FIG. 1A.
Figure 9A:
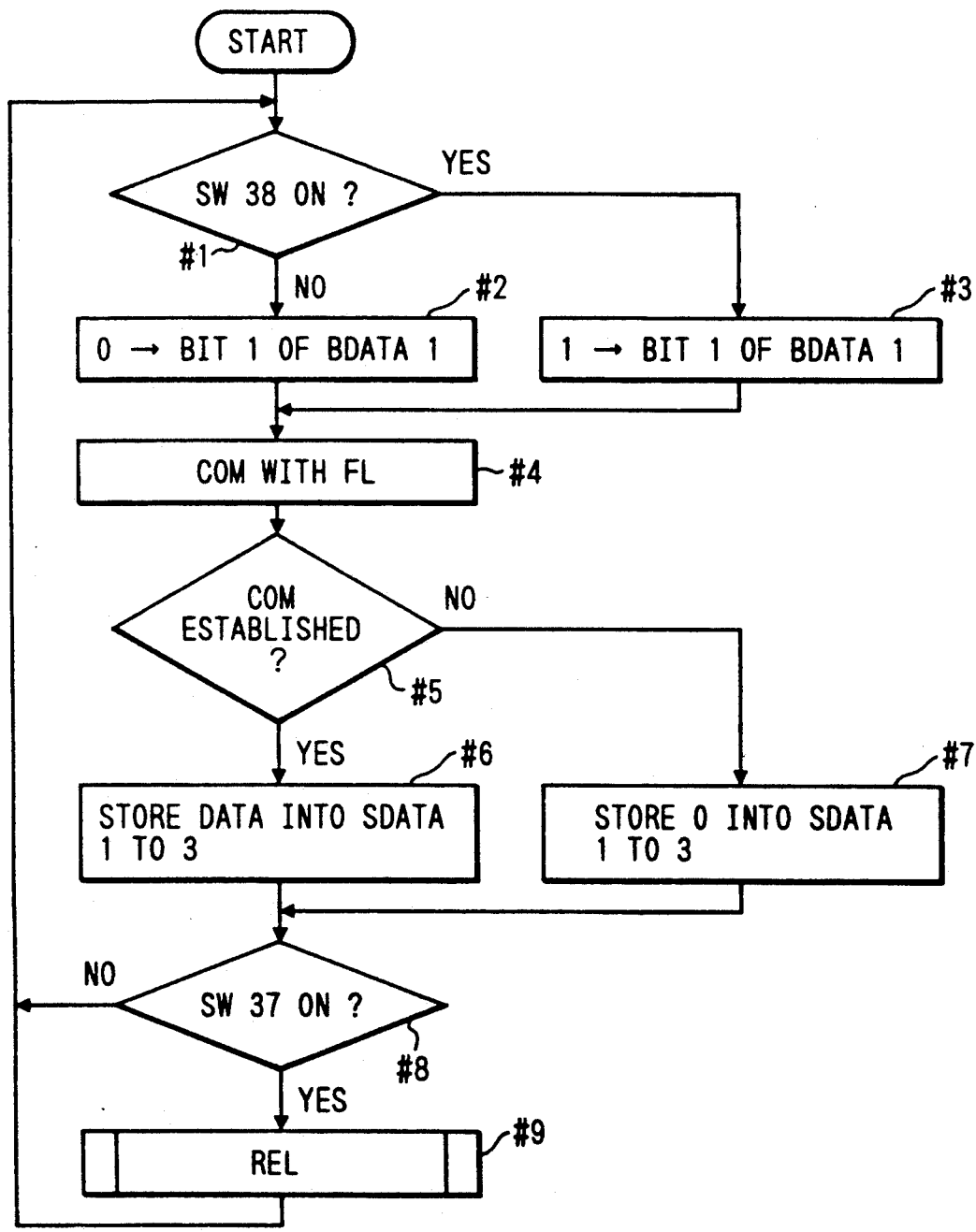
FIGS. 9A and 9B are flow charts which illustrate the operation of a microcomputer included in a camera body in the TTL automatic light controlling camera system shown in FIG. 1A.
Figures 2, 9B:
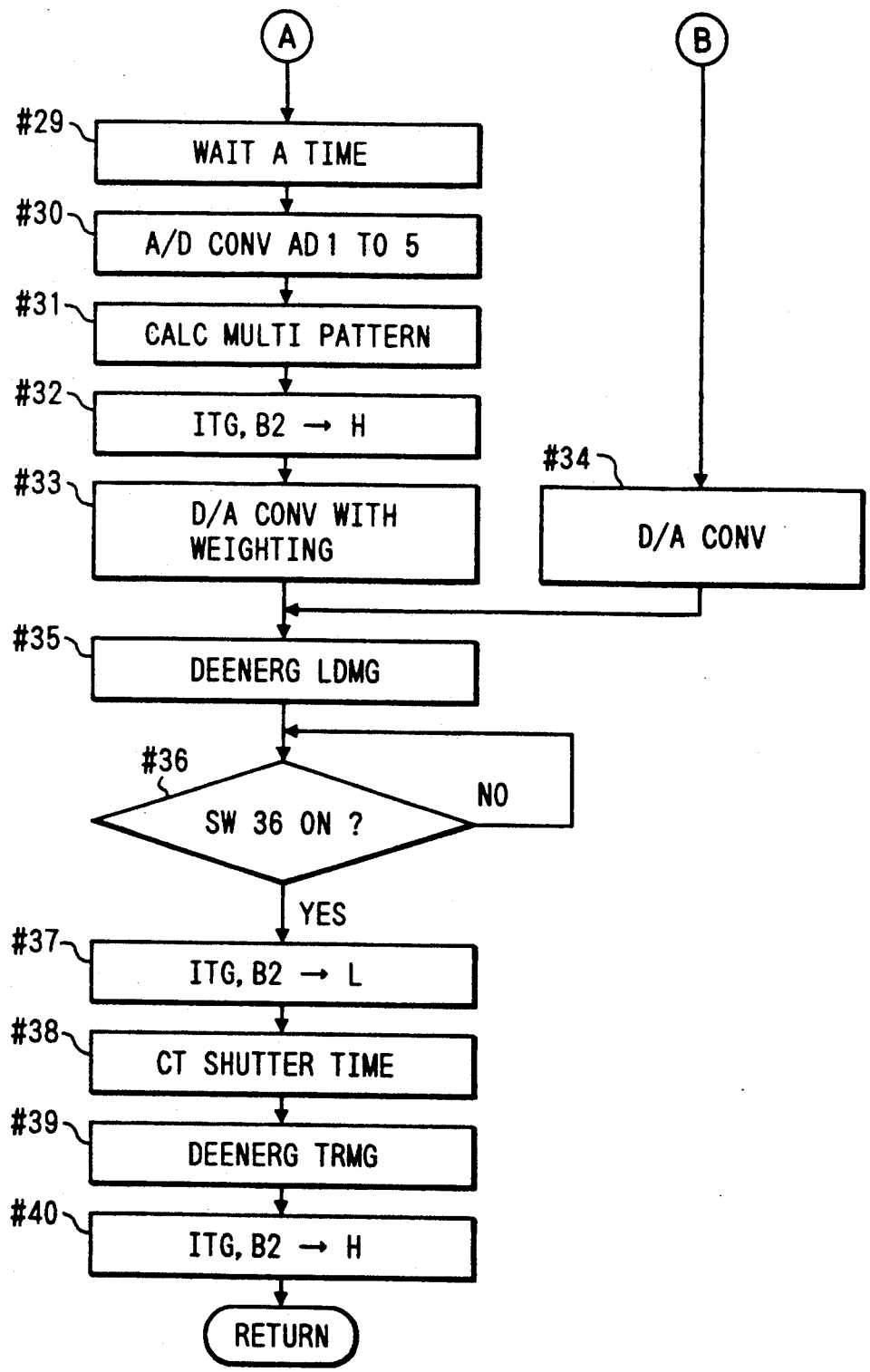

The release routine is shown in FIG. 9B. In #21, power is supplied to the two magnets 31 and 32 of the front and the rear curtains. Then, an operating means (omitted from illustration) is operated so that the mirror-up operation is started in #22 (at point b shown in FIG. 8B). In #23, the fact that mirror-up switch 35 informing the fact that the mirror-up operation has been ended is switched on is waited. When the mirror-up switch 35 is switched on (at point c shown in FIG. 8C), it is immediately determined whether or not the bit 0 of the memory SDATA 1 and the bit 1 of the BDATA 1 are respectively 1 in #24 and #25. The above-described flags respectively store whether or not the method of controlling set for the flashing device 101 is the TTL control mode and whether or not the method of controlling set for the camera body 1 is the TTL multicontrol mode. In a case where both the two flags are 1, that is, in a case where the flashing device has selected the TTL control mode and the camera body 1 has selected the TTL multicontrol mode, the flow advances to #26 in which whether or not the bit 2 of the memory SDATA 1 is 1. If this flag is 1, that is, if the main capacitor of the flashing device 101 has been fully charged, the flow advances to step #27 and ensuing steps in which an operation for detecting information about the subject field is started. That is, a D/A conversion is performed in #27 (at point d shown in FIGS. 8(h) to 8(l) for the purpose of applying the same voltage to all of five gain setting voltage input terminals VG1 to VG5 of the photometric/light-controlling circuit 11. Then, the flow advances to #928 in which the level of the integration start signal at the terminal ITG of the photometric/light-controlling circuit 11 is lowered. Furthermore, the contact B2 for the flashing device 101 is lowered (at point e shown in FIGS. 8 (m) and 8 (n). As a result, the flashing device 101 starts the pre-emission so that the quantity of light emitted is enlarged as shown by the emission waveform from the point e to the point f shown in FIG. 8 (o).

The photodiodes PD11 to PD51 of the photometric/light-controlling circuit 11 receive light reflected from the subject field so as to transmit the photoelectric current which is in proportion to the intensity of the received light. The operations of the circuit ensuing from the above-described point will be described with reference to the first channel related to the photodiode PD11. The photoelectric current generated in the photodiode PD11 is converted into a voltage output which has been logarithmically compressed by the OP amplifier A11 and the feedback diode D11. Then, the voltage output is converted into a current output which has been again logarithmically elongated by the transistors Q11 and Q12 arranged in such a manner that the above-described voltage level is used as its emitter potential and input voltage from a gain setting input terminal VG1 is used as its base potential. As a result, the collector currents of the transistors Q11 and Q12 are amplified by the gain determined by the potential of the VG1 while maintaining the proportional relationship with the photoelectric current. Consequently, the output current waveform similar to the waveform of the emitted light shown in FIG. 8 (o) is formed. The collector current of the transistor Q12 is converted into a source current of the same value by a current mirror circuit consisting of the transistors Q13 and Q14. The source current is used to charge the capacitor C11 which has been released from the short-circuit state by the lowering of the ITG signal. The charging voltage of the capacitor C11 is converted into a voltage output of a low impedance by a buffer amplifier A12 so as to be transmitted through an output terminal VO1. This output voltage is raised from the point e to point f shown in FIG. 8 (r) in the waveform of the VO1. The above-described output voltage is expressed in the form of voltage from the reference GND level, the voltage being obtained by integrating the photoelectric current which has been amplified by a predetermined gain. In the channels ensuing the second channel, the similar circuit operations are performed except for the quantity of light reflected from the subject field is independently changed. The transistors Q11 to Q51 transmit the currents obtained by amplifying the photoelectric currents with the same gain since the same voltage has been given to the VG1 to VG5 so so as to have the same gain. Since the above-described transistors Q11 to Q51 are connected to one another in series, the current obtained by amplifying the sum of the photoelectric currents of the channels is used to charge the capacitor C1. The terminal voltage of the capacitor C1 is changed as designated by the waveform of the integrated voltage of C1 shown in FIG. 8 (p). When the above-described voltage is lower than reference voltage E2, a comparator CP1 reverses the output so that the level of the terminal STOP is changed from high level to the low level, the signal being transmitted to the flashing device 101 via the contacts B1 and S1 (at the point f shown in FIG. 8 (q)). As a result, the flashing device 101 stops the emission of light. Therefore, the photodiodes PD11 to PD51 do not generate photoelectric currents so that the charging of the integrating capacitors C11 to C51 is stopped. As a result, the voltage of each of the output terminals VO1 to VO5 is fixed.

Then, waiting for a predetermined time is performed in #29 in a flow chart shown in FIG. 9B while estimating the longest time taken to complete the pre-emission light control operation in order to secure the time for the photometric/light-controlling circuit 11 to perform the above-described operation. In #30, the integrated voltage due to the pre-emission from the output terminals VO1 to VO5 which correspond to the regions of the divided subject field is A/D-converted by the A/D converter including a microcomputer. In #31, the result of the A/D conversion is subjected to a predetermined multipattern calculation algorithm so that the degree of weighting of the divided regions at the intrinsical emission for the photographing operation is determined. As for the contents of the multipattern calculation algorithm, the contents of the above-described disclosure Japanese Patent Application No. 1-203735 may be employed. However, it is omitted from description since it is not related to the thesis of the present invention. When the multipattern calculation is ended, the level of each of the ITG and the contact B2 is returned to high level in #32 (point g shown in FIGS. 8 (m) and 8 (n)). The integrating capacitors C1 and C11 to C51 in the photometric/light-controlling circuit 11 are discharged, and a preparation for the next light emission is made. In #33, the D/A conversion of the five channels is performed (at point h shown in FIGS. 8 (h) to (l)) in order to apply the gain setting voltage to the terminals VG1 to VG5 while reflecting the degree of weighting the divided regions obtained in #31 and estimating the adjustment of the gain with respect to the sensitivity of the film. As a result, the current the amplitude rate of which has been raised is integrated for the divided region which has been weighted by a larger degree.

After the above-described preparing operations have been completed, power supply to the front curtain magnet 31 is cancelled (at point i shown in FIG. 8 (d)) in order to start the actual shutter releasing operation in #35. As a result, the front curtain 87 commences the moving operation. In #36, the fact that the switch 36 is switched on after the shutter has been fully opened is waited for. When the same is switched on (at point j shown in FIG. 8 (g)), both the ITG and the contact B2 are lowered in #37 so as to instruct the flashing device 101 to start the intrinsic emission. Furthermore, the integrating operation of the photometric/light-controlling circuit 11 is permitted. Thus, the flashing device 101 emits light as designated as the waveform of emitted light shown in FIG. 8 (o). As a result, the integrating capacitor C1 is charged in the photometric/light-controlling circuit 11 with the sum of the elongated currents of the transistors Q11 to Q51 which have been weighted. When the above-described sum exceeds the predetermined reference voltage E2, the level of the stop terminal is lowered from high level to low level so as to be supplied to the flashing device 101 via the contact B1 and S1. As a result, the light emitting operation of the flashing device 101 is stopped (point k shown in FIG. 8 (o)). At this time, the exposure for the photography performed while using the flashing device 101 as the light source is ended. The program in the microcomputer 12 counts the time elapsed from the stoppage of the power supply to the front curtain magnet 31 in #35 so as to stop the power supply to the rear curtain magnet 32 in #39 (point l shown in FIG. 8 (e)) when the established shutter time has elapsed. Furthermore, the levels of the two terminals ITG and the contact B2 are immediately returned to the high levels in #40 so as to prepare for the operation for shutter-releasing the next frame. Subsequently, when a shutter charge operating means, a mirror-down operating means or the like (omitted from illustration) are operated, the switches relating to each of the sequences are returned to the original switched-off state at points m and n shown in FIGS. 8 (c) and 8 (g). Thus, the shutter releasing operations are completed.

In a case where the TTL normal light control mode is selected as the TTL control in the camera body 1 in #25, the pre-emission operations in #26 to #33 are not performed but the flow advances to #34 in which the D/A conversion of the five channels is performed in order to apply predetermined gain setting voltage to the terminals VG1 to VG5 while estimating only the film sensitivity so that each of the divided regions is uniformly weighted. Referring to the timing chart shown in FIG. 8, the change in the signal waveform is not changed from point d to point h shown in FIGS. 8(h) to 8(l) but the operation arranged to be performed at point h is performed at point d. Therefore, the last transition pulses from point e to point g of the ITG and the contact B2 shown in FIGS. 8 (m) and 8 (n) are not transmitted in this case. As a result, the pre-emission from the flashing device 101 is not performed. Then, the flow advances to #35 in which the above-described shutter release operation is started. As a result, the TTL normal light control is performed while subjecting all of the regions of the film surface to the uniform photometry (mean photometry).

If the TTL multicontrol mode is selected in the camera body 1 in #25, the pre-emission is not performed and the flow advances to #34 in which the TTL normal light control is performed while performing the above-described mean photometry in a case where it has been determined in #26 that charging of the flashing device 101 has not been completed. That is, in the TTL normal light control, if the charge has not been completed, the light emission is permitted because there is a possibility that the quantity of the light emission is sufficient. However, in the TTL multicontrol, a portion of the accumulated energy in the main capacitor is consumed due to the pre-emission. Therefore, although information about the subject field can be detected, there is a risk that energy necessary to perform the intrisic emission is not sufficient. As a result, the TTL multicontrol is prohibited. That is, in the case of the TTL multicontrol, the flashing device 101 successively performs the pre-emission and the intrinsic emission from the one main capacitor. Therefore, in a case where the voltage has not been raised sufficiently, a problem of an insufficient quantity of light will take place. As a result, if both the camera body 1 and the flashing device select the TTL control mode and the TTL multicontrol mode, the TTL normal light control mode is automatically selected in place of the TTL multicontrol mode if the charged voltage level of the flashing device 101 has not been completed.

In a case where the flashing device 101 selects a control mode except for the TTL control mode in #24, the flow also advances to #3 and 4 in which the camera body performs the light control operation. However, since the flashing device requires only the emission start signal, the flashing device determines the quantity of light.

In a case where the mounted flashing device is a conventional type which is able to perform the TTL normal light control, the data communication cannot be performed in #5 of the flow chart shown in FIG. 9A. Therefore, all of SDATA 1 to 3 are cleared in #7. As a result, the flow advances from #24 to #34 shown in FIG. 9B in which the D/A conversion is performed in such a manner that the same voltage estimating the sensitivity of the film is applied to the VG1 to VG5.

Thus, the TTL normal light control operation is performed.

Figure 10B:
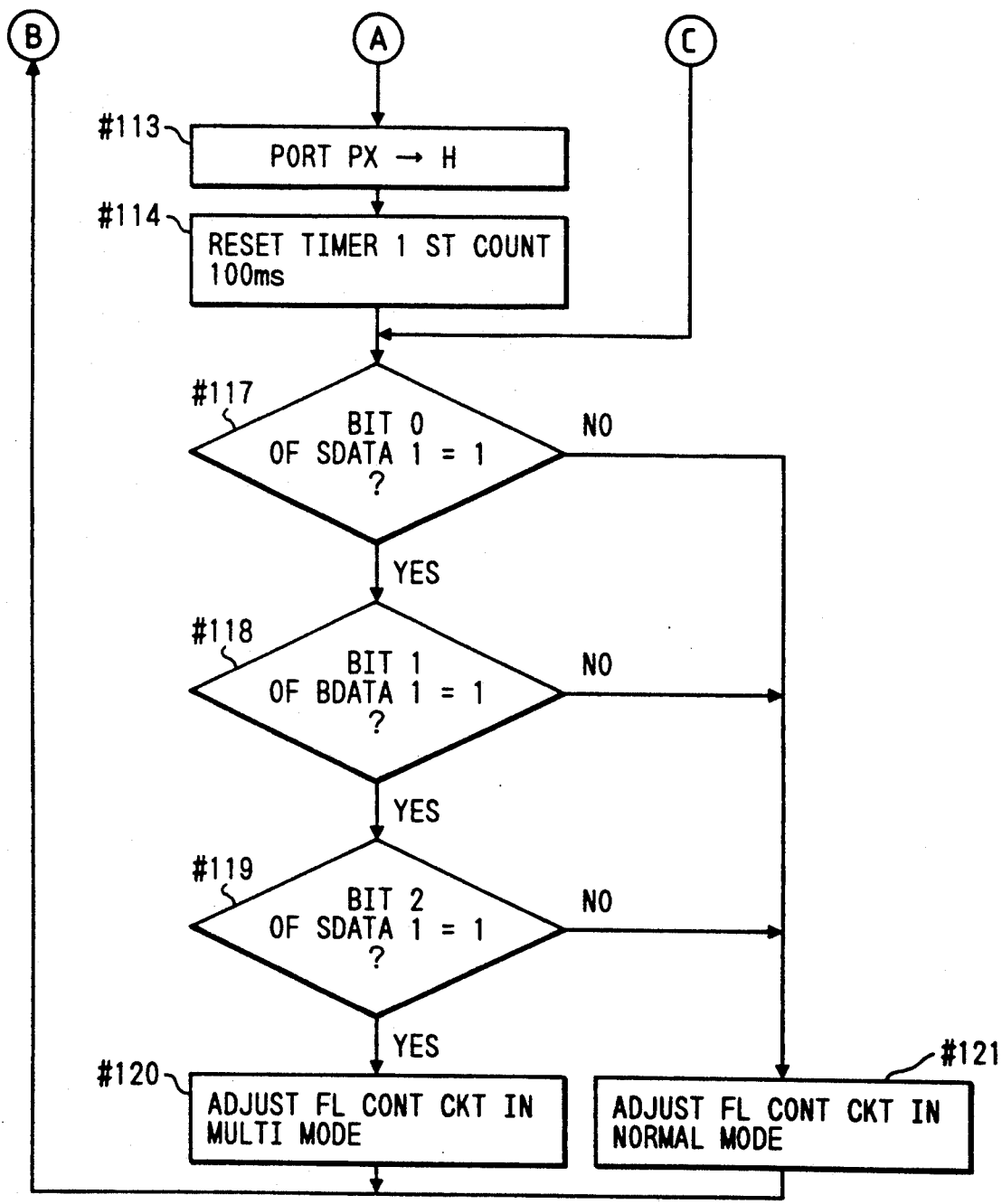
FIG. 10 is a flow chart which illustrates the operation of a microcomputer included in a flashing device in the TTL automatic light controlling camera system shown in FIG. 1A.

The operation of the portion including the flashing device 101 will now be described with reference to the timing chart shown in FIG. 8 and a flow chart shown in FIG. 10.

When power is supplied and the microcomputer 113 of the flashing device 101 commences its program, an included timer I starts time counting for 100 ms in #101 for the purpose of determining whether or not data is supplied from the camera body 1 for a predetermined time or longer. In next step #102, it is determined whether or not the input port P3 is low level, that is, whether or not the light controlling mode switch 121 of the flashing device 101 is at the position for selecting the TTL control mode. If it is at the low level, that is, if the TTL control mode is selected, the bit 0 of the memory SDATA1 is set in #103. If it is at the high level, that is, if the external light control mode or the manual emitting mode is selected, the above-described bit 0 is cleared in #104. In the next step #105, it is determined whether or not the input port PY is low, that is, it is determined whether or not the charged voltage level of the main capacitor has been raised by the voltage raising circuit in the emission control circuit 112 over a predetermined level. If the charged voltage level is low, that is, if the charging operation has been completed, the bit 2 of the memory SDATA 1 is set in #106. If it is high, that is, if the charging operation has not been completed, the above-described bit 2 is cleared in #107. Then, the flow advances to #108 in which the I/O port PX is set to the input mode before the I/O port PX, that is, the level of the contact S3 is determined in #109. In a case where it is low level, a demand of the serial data communication is issued from the camera body 1. Therefore, the flow advances to #110 in which the port PX is switched to the output mode before the above-described port PX is switched to low level in #111. The camera body 1 thus recognizes the fact that the flashing device 101 has completed the preparation for the communication. As a result, the above-described serial data communication is started. After the communication has been ended, the port PX is returned to the high level in #113 before the counter of the timer I is reset in #114 and the counting for 100 ms is again started. On the other hand, if it is determined in #109 that the port PX is high level, the flow advances to #115 in which the completion of the time counting operation performed by the timer I is checked. If the time of 100 ms has been elapsed, the bit 1 of the memory BDATA 1 is cleared in #116. That is, in the case where the camera body connected is a type which does not perform the serial data communication, it is determined that the subject camera body is a type which has no TTL multicontrol mode. Therefore, a flag corresponding to this fact is independently cleared. If it has been determined in #115 that the time counting operation performed by the time I has not been ended, the flow advances to #117 without performing the operation in #116.

In #117, #118 and #119, it is determined whether or not the bit 0 of the memory SDATA 1, the bit 1 of the BDATA 1 and the bit 2 of the SDATA 1 are respectively 1. The above-described determinations are made so as to determine: (1) whether or not the light control mode of the flashing device 101 is the TTL control mode; (2) whether or not control mode of the TTL control mode set in the camera body 1 is the TTL multicontrol mode; and (3) whether or not the flashing device 101 has been completely charged. If the above-described bits are respectively 1, that is, if the flashing device 101 has selected the TTL control mode, the camera body 1 has selected the TTL multicontrol mode and the flashing device 101 has been completely charged, the flow advances to #120 in which the internal logic of the emission control circuit 112 is set so that trigger signals supplied through the contact S2 are used in such a manner that the first signal is used to perform the pre-emission and the second signal is used to the intrinsic emission. The emission control circuit 112 controls the emission operation in such a manner that the quantity of light emitted is limited to a predetermined quantity at the pre-emission process even if no emission stop signal is supplied through the contact S1. For example, if the flashing device 101 is a type the guide number of which is "32", the maximum quantity of light to be emitted at the pre-emission process is arranged to be about guide number "8" so that the quantity of energy to be consumed at the full light emission is restricted to 1/16 of the maximum value.

If it has been determined in #117 to 119, at least one of the bit 0 of the memory SDATA 1, the bit 1 of the BDATA 1 and the bit 2 of the SDATA 1 is 0, that is, if the flashing device 101 is set to a mode other than the TTL control mode, if the camera body 1 is set to the TTL normal light control mode or if the flashing device 101 has not been completely charged, the internal logic of the emission control circuit 112 is set so that the trigger signal for starting the light emission supplied from the contact S2 in #121 is used in a conventional manner in which the first trigger signal is used to intrinsically emit light. Then, the flow returns to #102 and the above-described processes are repeated.

In a case where the flashing device has selected the TTL control mode and the coupled camera body is a conventional type capable of performing the TTL normal light control, the bit 1 of the BDATA 1 becomes 0. Therefore, the flow advances similarly in such a manner that the intrinsic emission is started in response to the emission starting trigger supplied through the contact S2 and the emission is stopped in response to the emission stop signal supplied through the contact S1. Thus, the normal TTL controlling operation is completed.

Figure 1B:
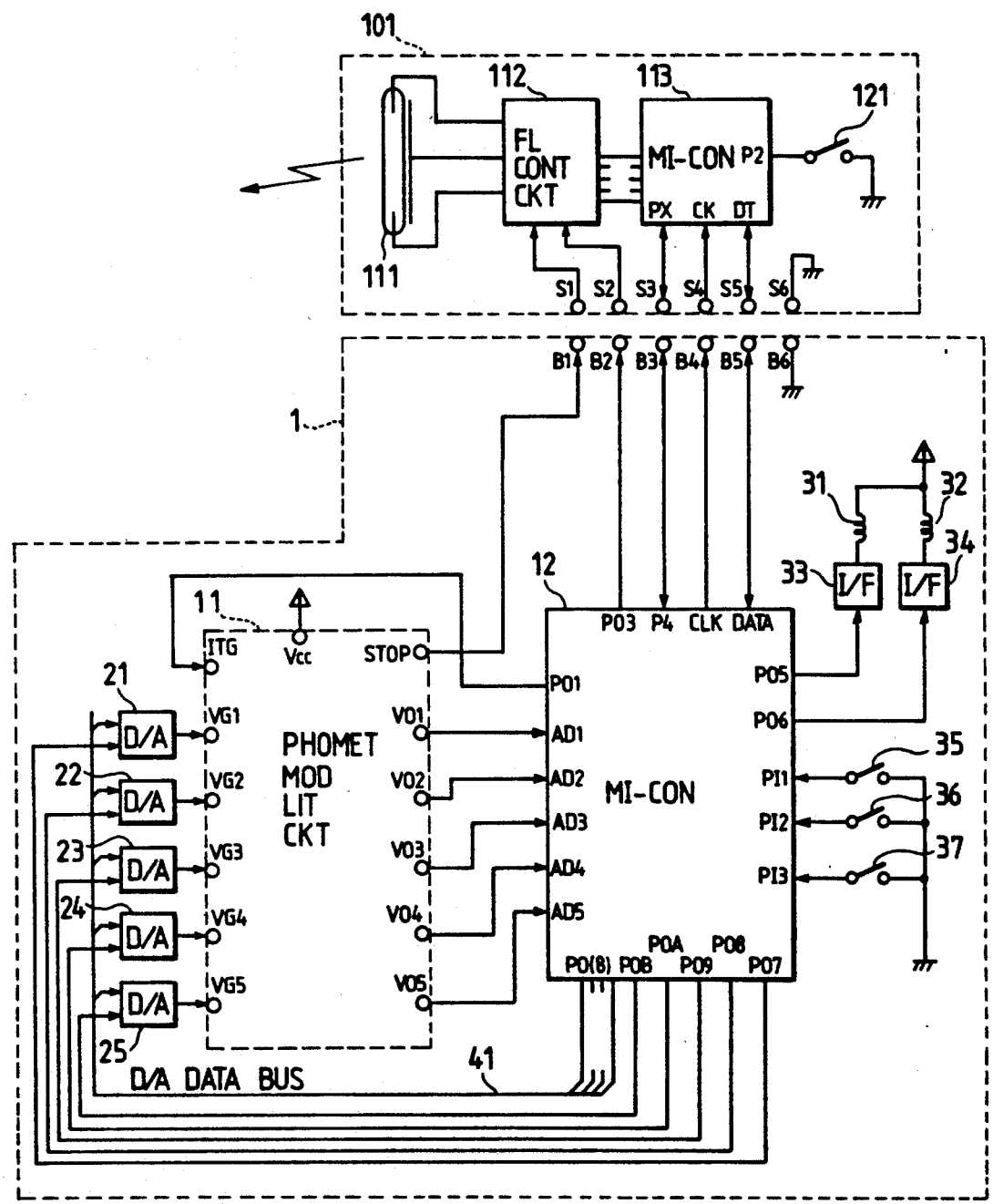

FIG. 1B is a circuit block diagram which illustrates another embodiment of the TTL automatic light controlling camera system.

The TTL automatic light controlling camera system according to this embodiment comprises the camera body 1 and the flashing device 101 which can be electrically coupled to each other via the contacts B1 to B6 and S1 to S6, where the contacts B6 and S6 are GND connecting terminals.

The flashing device 101 comprises a light emitting portion 111, an emission control circuit 112 and a microcomputer 113. The emission control circuit 112 includes a voltage raising circuit, a main capacitor, an emission control SCR and the like. The emission control circuit 112 intrinsically acts to receive an emission start signal supplied through the contact S2 and an emission stop signal supplied through the contact S1 so as to control the start and stop of the emission of light from the light emitting portion 111. The contacts S3, S4 and S5 are directly connected to the microcomputer 113 at its input port PX, a clock input terminal CK and a data I/O terminal DT. As a result, the flashing device 101 is able to perform a serial data communication with the camera body 1. Furthermore, a signal line from a light control mode switch 121 is connected to the input port Pl of the microcomputer 113. The light control mode switch 121 is a switch which acts in synchronization with the action of an operation member with which a photographer selects a mode of the flashing device 101 from the TTL multicontrol mode and the TTL normal light control mode. Furthermore, the microcomputer 113 is electrically connected to the emission control circuit 112 so that the method of controlling the light emitting method is in accordance with the set light controlling method.

The camera body 1 mainly comprises a photometry/light-control circuit 11 and a microcomputer 12.

First, the photometry/light-control circuit 11 will be described with reference to FIG. 5 which illustrates its internal circuit. Reference numerals PD11 to PD51 represent photodiodes serving as photoelectrically converting means divided into five regions also shown in FIG. 4, the photodiodes PD11 to PD51 respectively emitting photoelectric currents which are in proportion to the illumination intensities. The photoelectric current emitted from the photodiode PD11 is logarithmically compressed by an OP amplifier A11 to which the photodiode PD11 is fed back, the photoelectric current being thus converted into a voltage output which is determined in accordance with reference power source E1. Each of transistors Q11 and Q12 is arranged in such a manner that the above-described voltage level is used as its emitter potential and input voltage from a gain setting input terminal VG1 is used as its base potential. The transistors Q11 and Q12 emit collector currents which have been logarithmically elongated with the gain determined in accordance with the potential difference. The collector current emitted from the transistor Q12 is reversed by the current mirror circuits of the transistors Q13 and Q14 so as to charge the capacitor C11. The voltage charged in the capacitor C11 is, via the follower amplifier A12, transmitted to the integrated voltage output terminal VO1. The FET Q15 receives a signal supplied through the integration control signal input terminal ITG so that it discharges overall charge accumulated in the capacitor C11. The above-described operations are commonly performed in the other photometric circuits in which the terminals VO2 to VO5 serve as the outputs. On the other hand, the collector currents emitted from the transistors Q11 to Q51 are added so as to charge the capacitor C1. The voltage charge in the capacitor C1 is subjected to a comparison with reference voltage E2 by the comparator CP1. The output from the comparator C11 is reversed from L to H when the relationship is reversed, and the output terminal STOP is changed from H to L. The FET Q1 receives a signal supplied through the integration control signal input terminal ITG so that the overall charge accumulated in the capacitor C1 is discharged.

The microcomputer 12 will now be described. The microcomputer 12 transmits selection signals from its five output ports PO7 to POB while transmitting, via the data bus 41, data to the D/A converters 21 to 25 from its 8-bit output PO(8), so that individual voltage levels are set to the D/A converters 21 to 25. An output voltage from each of the D/A converters 21 to 25 is received by the gain setting input terminals VG1 to VG5 of the photometric/light-controlling circuit 11. The five integrated voltage output terminals VO1 to VO5 of the photometric/light-controlling circuit 11 are respectively connected to the A/D converting input terminals AD1 to AD5 of the microcomputer 12. The output port PO1 is connected to the integration control signal input terminal ITG. Reference numerals 35 and 36 are mechanical switches which act in accordance with an operative sequence of the camera. Reference numeral 35 represents a mirror-up switch which is switched on when a mirror-up operation has been completed. Reference numeral 36 represents a synchronizing switch which is switched on when the shutter has been fully opened. Reference numerals 37 represents a release starting switch which is switched on when a shutter release button is depressed by a photographer. The signals from the above-described three switches 35, 36 and 37 are respectively supplied to input ports P11 to P13 with a pull-up resistor of the microcomputer 12. Reference numerals 31 and 32 are magnets for holding the front curtain 87 and the rear curtain 89. Signals from the output ports P05 and P06 of the microcomputer 12 are supplied to the magnets 31 and 32 via interfaces 33 and 34 so that their operations are controlled. The emission stop signal supplied through the STOP terminal of the photometric/light-controlling circuit 11 is transmitted to the emission control circuit 112 of the flashing device 101 via the contact B1 disposed between the STOP terminal and the flashing device 101. The emission start signal is supplied through the output port PO3 of the microcomputer 12 to the flashing device 101 via the contact B2. The camera body 1 and the flashing device 101 perform the serial data communication via the contacts B3 to B5 which are respectively connected to the output terminal P4, the clock output terminal CLK, the serial data I/O terminal DATA of the microcomputer 12.

The operation of the thus constituted TTL automatic light controlling camera system will now be described.

Figure 11:
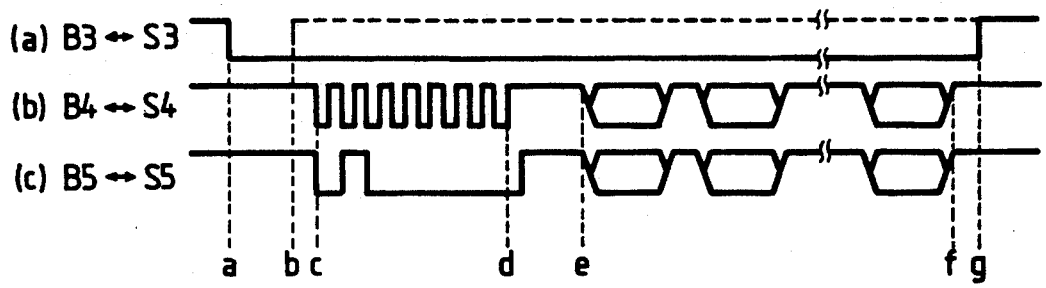
FIG. 11 is a flow chart which illustrates the data communicating operation performed in the TTL automatic light controlling camera system shown in FIG. 1B.

First, the serial data communication performed between the microcomputer 12 of the camera body 1 and the microcomputer 113 of the flashing device 101 via the contacts B3 to B5 and S3 to S5 will be described with reference with a timing chart shown in FIG. 11.

The camera body 1 usually transmits high level signals to the contact B3 while making the I/O port P4 of the microcomputer 12 to be an output state. When the data communication with the flashing device 101 is performed, the camera body 1 transmits a low level signal to the terminal of the flashing device 101 (at point a shown in FIG. 11A). After a predetermined time has elapsed (at point b), the microcomputer 12 switches the I/O port P4 to an input state with a pull-up resistor so as to determine the level of the contact B3. On the other hand, the flashing device 101 makes the I/O port PX of the microcomputer 113 into an input state so as to always check the level of the contact S3. If the flashing device 101 detects the low level, it switches the I/O port PX to an output state from that point so as to transmit a low level signal. If the level of the contact B3 at point b is low, the camera body 1 determines that the flashing device 101 capable of performing the data communication has been mounted and it starts the serial data communication. If the level of the contact B3 is high at point b, the camera body 1 determines that the flashing device 101 capable of performing the data communication has not been mounted and it stops the communicating action at that point. In a case where the communicating action is started, the camera body 1 transmits first data through the contact B5 in synchronization with the clock supplied through the contact B4 at point c. When data for 8-bit has been transmitted at point d, the camera body 1 stops the transmission of the first data. Then, transmission of data items of a predetermined number from the camera body 1 and receipt of the data from the flashing device 101 are performed at predetermined intervals. The camera body 1 and the flashing device 101 respectively recognize the one time of the data communication when the transmission and the receipt of data of the predetermined number have been completed at the point (point f). The flashing device 101 stops the transmission of the L level signals through the contact S3 at point g and makes the I/O port PX to be an input state.

Figure 12:
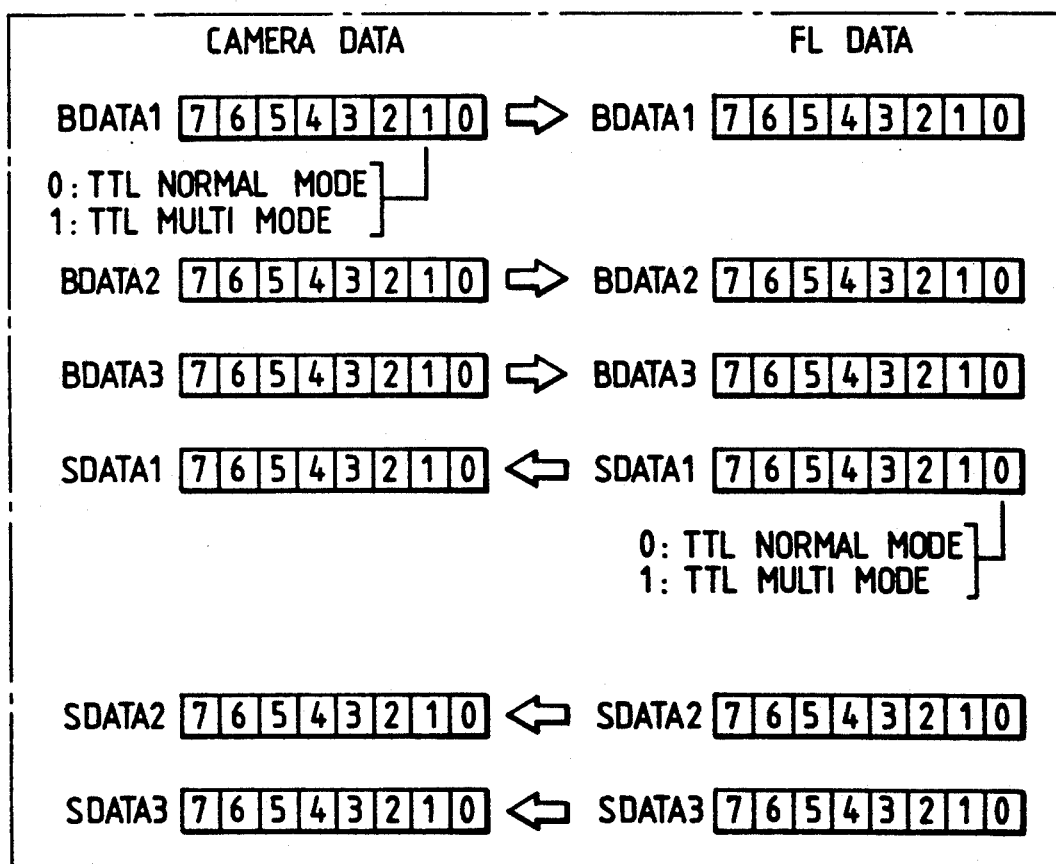
FIG. 12 illustrates the bit map of data to be communicated in the TTL automatic light controlling camera system shown in FIG. 1B.

Assuming that the numbers of the data items transmitted/received between the camera body 1 and the flashing device 101 are, for example, 3 bytes respectively, the data communication is performed as shown in FIG. 12. Referring to FIG. 12, data items transmitted from the camera body 1 to the flashing device 101 are called BDATA 1 to BDATA 3 and data items transmitted from the flashing device 101 to the camera body 1 are called SDATA 1 to SDATA 3. The contents of the data are various information set in the same. Bit 1 of BDATA 1 is arranged to be information about whether or not the camera body 1 is a type capable of performing the TTL multicontrol operation. If the above-described bit is 1, a fact that the camera body is capable of performing the TTL multicontrol is informed to the flashing device 101. If the same is 0, a fact that the camera body cannot perform the TTL multicontrol to the flashing device 101. The camera body 1 is, of course, arranged in such a manner that the above-described bit is always 1. The bit 0 of the SDATA 1 is arranged to be information about whether the controlling method of the TTL control set in the flashing device 101 is the TTL multicontrol. If the above-described bit is 1, a fact that the TTL multicontrol mode is set is informed to the camera body 1. If the same is 0, a fact that the TTL normal mode is set is informed to the camera body 1.

General operations except for the data communicating operation will now be described with reference to a timing chart shown in FIG. 13 and flow charts shown in FIGS. 14A and 14B.

First, the normal operation except for the shutter release operation is performed in such a manner that the microcomputer 12 of the camera body 1 commences the execution of a program when power is supplied. As a result, the microcomputer 12 sets the bit 1 of the memory BDATA 1 in #1 shown in FIG. 14A. This is an operation of setting a flag which informs the camera body 1 is the type capable of performing the TTL multicontrol. Then, in #4, an attempt of the serial data communication with the flashing device 101 is made. If the communication can be established, data received in #4 is stored in the memories SDATA 1 to SDATA 3. If the communication cannot be established due to the fact that no response was detected, for example, in a case where the subject flashing device has the TTL controlling function but is a conventional type device which cannot be adapted to the TTL multicontrol system, 0 is stored in all of the bits of the SDATA 1 to 3 in #5. Then, the state of the switch 37, that is, the state of the release start switch 37 is determined in #6. If the switch 37 is switched off, the flow returns to #1. If the same is switched on, the flow advances to a release routine in #7. When the release routine is ended, the flow returns to #1 and thus the basic loop is formed. Referring to FIG. 13, the release start switch 37 is switched on at point a shown in FIG. 13A. This fact is detected in #6 of the flow chart, and then the release operation is started at point b.

Figure 13:
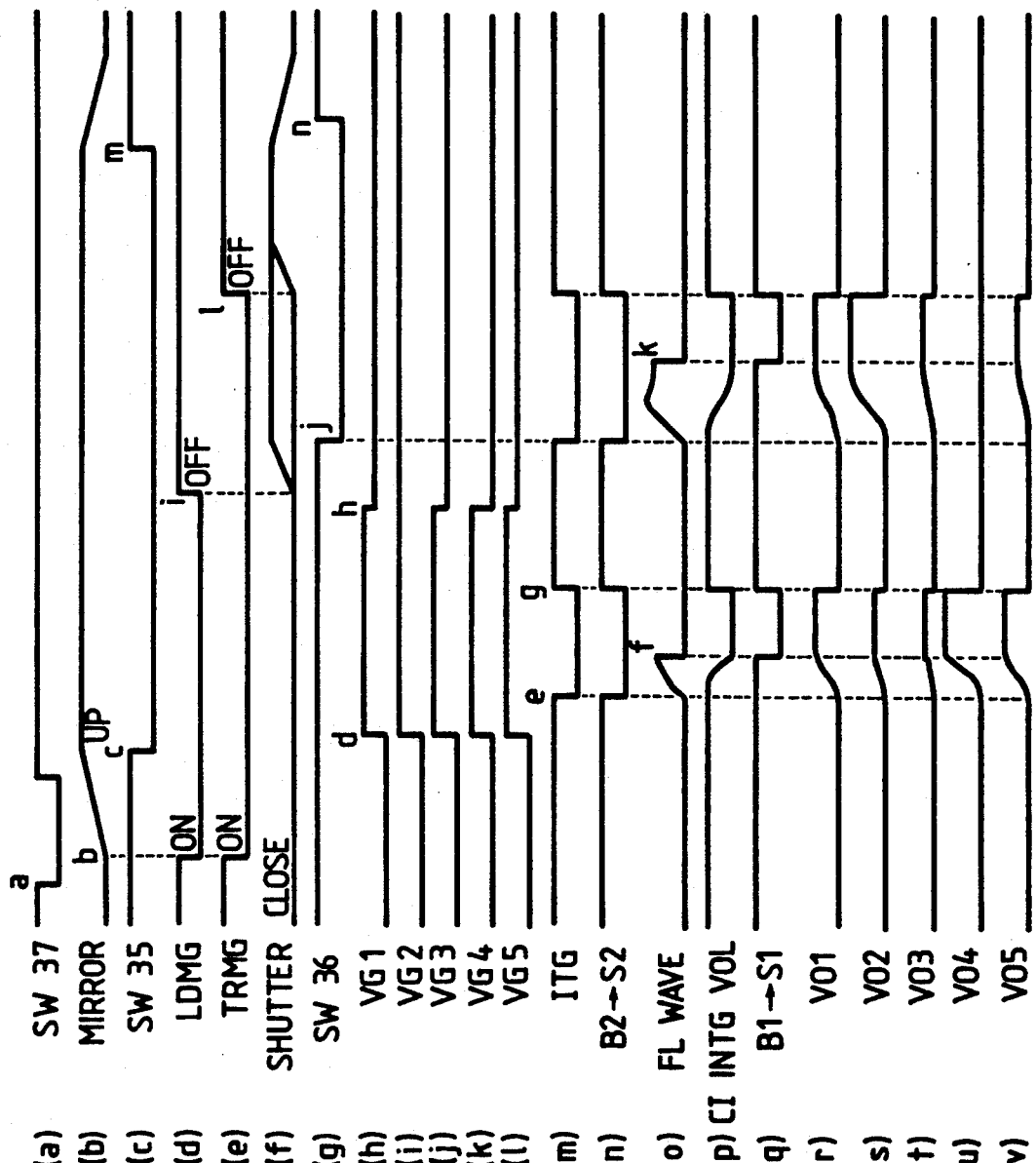
FIG. 13 is a timing chart for a release operation performed in the TTL automatic light controlling camera system shown in FIG. 1B.
Figure 14A:
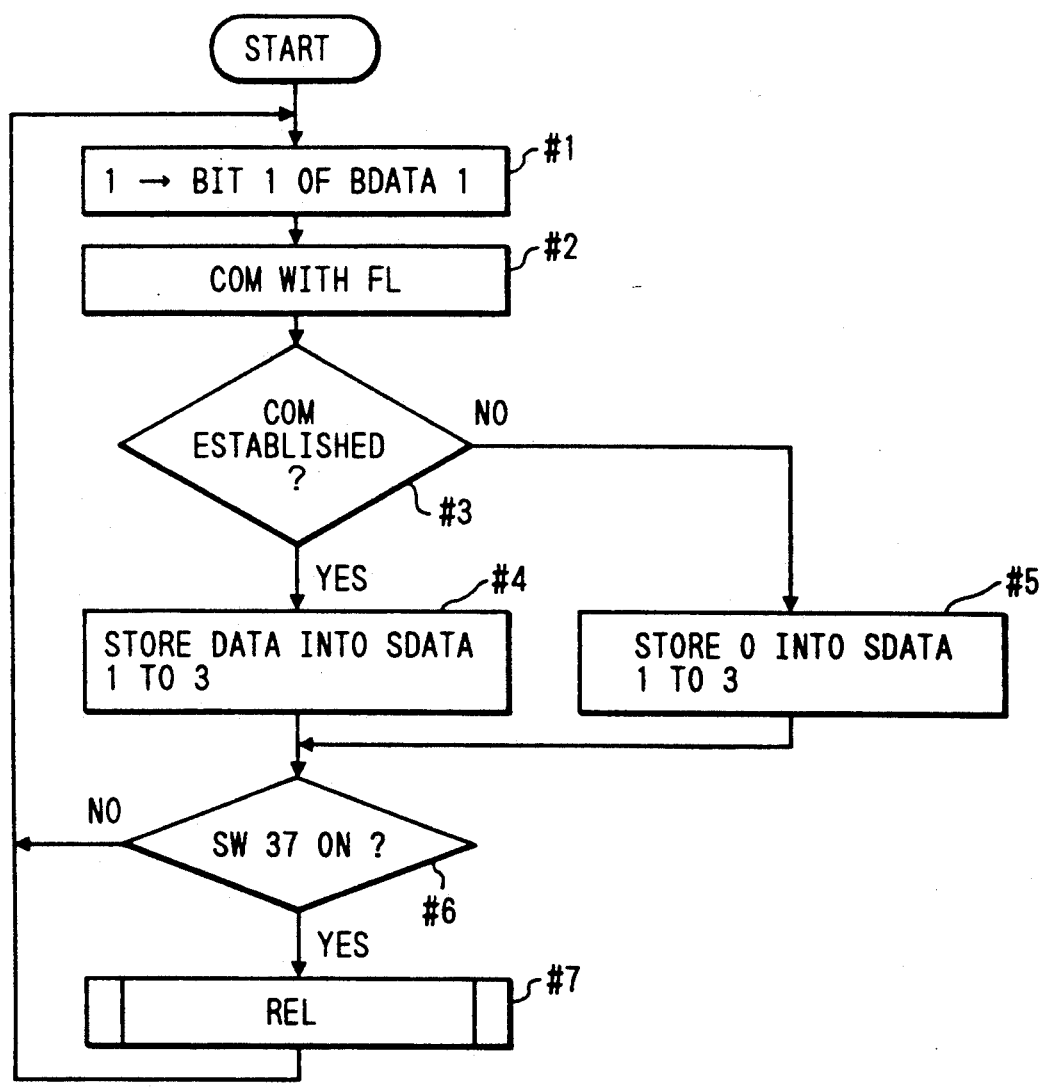
FIGS. 14A and 14B are flow charts which illustrate the operation of a microcomputer included in a camera body in the TTL automatic light controlling camera system shown in FIG. 1B.
Figures 1, 14B:
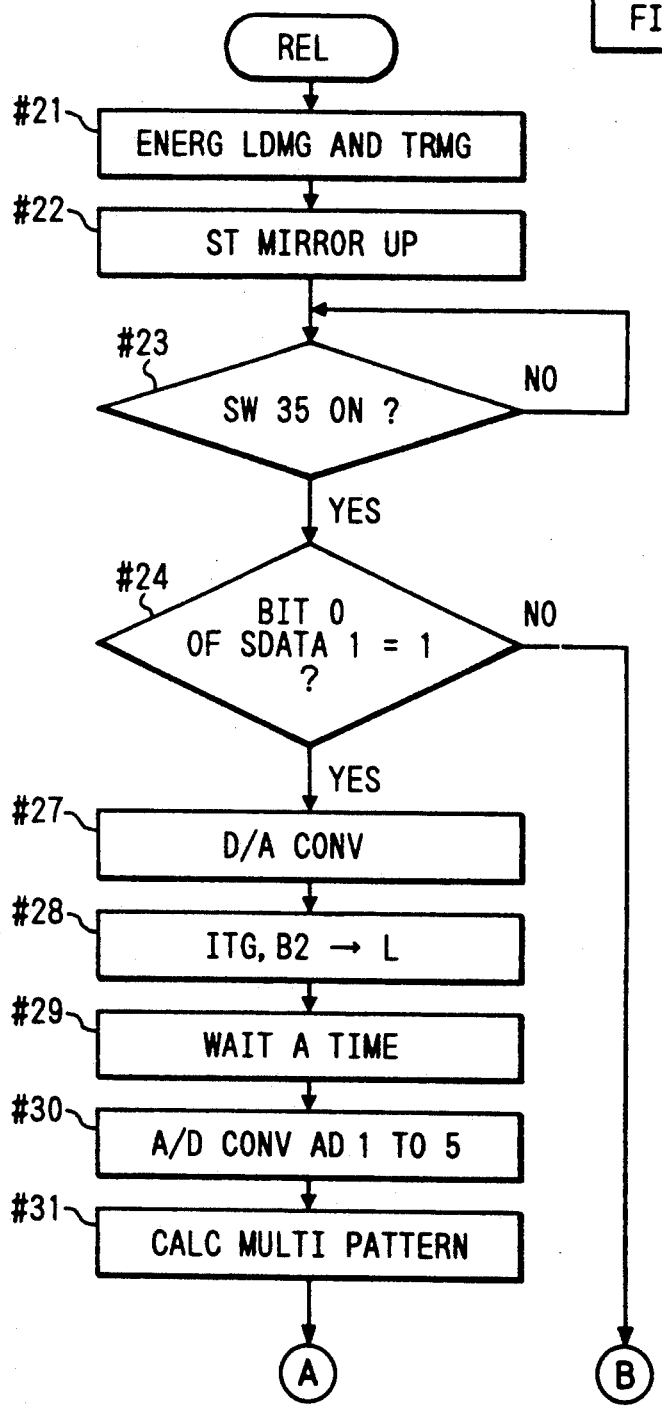

The release routine is shown in FIG. 14B. In #21, power is supplied to the two magnets 31 and 32 of the front and the rear curtains. Then, an operating means (omitted from illustration) is operated so that the mirror-up operation is started in #22 (at point b shown in FIG. 13B). In #23, the fact that mirror-up switch 35 informing the fact that the mirror-up operation has been ended is switched on is waited. When the mirror-up switch 35 is switched on (at point c shown in FIG. 13C), it is immediately determined whether or not the bit 0 of the memory SDATA 1 is 1 in #24. The above-described flag stores whether or not the method of controlling set for the flashing device 101 is the TTL multicontrol mode. In a case where it is 1, that is, in a case where the flashing device 101 has selected the TTL multicontrol mode, the flow advances to #27 in which the D/A conversion is performed in (at point d shown in FIGS. 13 (h) to 13 (l)) for the purpose of applying the same voltage to all of five gain setting voltage input terminals VG1 to VG5 of the photometric/light-controlling circuit 11. Then, the flow advance to #28 in which the level of the integration start signal at the terminal ITG of the photometric/light-controlling circuit 11 is lowered. Furthermore, the contact B2 for the flashing device 101 is lowered (at point e shown in FIGS. 13 (m) and 13 (n). As a result, the flashing device 101 starts the pre-emission so that the quantity of light emitted is enlarged as shown by the emission waveform from the point e to the point f shown in FIG. 13 (o).

The photodiodes PD11 to PD51 of the photometric/light-controlling circuit 11 receive light reflected from the subject field so as to transmit the photoelectric current which is in proportion to the intensity of the received light. The operations of the circuit ensuing from the above-described point will be described with reference to the first channel related to the photodiode PD11. The photoelectric current generated in the photodiode PD11 is converted into a voltage output which has been logarithmically compressed by the OP amplifier A11 and the feedback diode D11. Then, the voltage output is converted into a current output which has been again logarithmically elongated by the transistors Q11 and Q12 arranged in such a manner that the above-described voltage level is used as its emitter potential and input voltage from a gain setting input terminal VG1 is used as its base potential. As a result, the collector currents of the transistors Q11 and Q12 are amplified by the gain determined by the potential of the VG1 while maintaining the proportional relationship with the photoelectric current. Consequently, the output current waveform similar to the waveform of the emitted light shown in FIG. 13 (o) is formed. The collector current of the transistor Q12 is converted into a source current of the same value by the current mirror circuit consisting of the transistors Q13 and Q14. The source current is used to charge the capacitor C11 which has been released from the short-circuit state by the lowering of the ITG signal. The charging voltage of the capacitor C11 is converted into a voltage output of a low impedance by the buffer amplifier A12 so as to be transmitted through an output terminal VO2. This output voltage is raised from the point e to point f shown in FIG. 13 (r) in the waveform of the VO1. The above-described output voltage is expressed in the form of voltage from the reference GND level, the voltage being obtained by integrating the photoelectric current which has been amplified by a predetermined gain. In the channels ensuing the second channel, the similar circuit operations are performed except for the quantity of light reflected from the subject field is independently changed. The transistors Q11 to Q51 transmit the currents obtained by amplifying the photoelectric currents with the same gain since the same voltage has been given to the VG1 to VG5 so so as to have the same gain. Since the above-described transistors Q11 to Q51 are connected to one another in series, the current obtained by amplifying the sum of the photoelectric currents of the channels is used to charge the capacitor C1. The terminal voltage of the capacitor C1 is changed as designated by the waveform of the integrated voltage of C1 shown in FIG. 13 (p). When the above-described voltage is lower than reference voltage E2, the comparator CP1 reverses the output so that the level of the terminal STOP is changed from high level to the low level, the signal being transmitted to the flashing device 101 via the contacts B1 and S1 (at the point f shown in FIG. 13 (q)). As a result, the flashing device 101 stops the emission of light. Therefore, the photodiodes PD11 to PD51 do not generate photoelectric currents so that the charging of the integrating capacitors C11 to C51 is stopped. As a result, the voltage of each of the output terminals VO1 to VO5 is fixed.

Then, waiting for a predetermined time is performed in #29 in a flow chart shown in FIG. 14B while estimating the longest time taken to complete the pre-emission light control operation in order to secure the time for the photometric/light-controlling circuit 11 to perform the above-described operation. In #30, the integrated voltage due to the pre-emission from the output terminals VO1 to VO5 which correspond to the regions of the divided subject field is A/D-converted by the A/D converter including a microcomputer. In #31, the result of the A/D conversion is subjected to a predetermined multipattern calculation algorithm so that the degree of weighting of the divided regions at the intrinsical emission for the photographing operation is determined. As for the contents of the multipattern calculation algorithm, the contents of the above-described disclosure Japanese Patent Application No. 1-203735 may be employed. However, it is omitted from description since it is not related to the thesis of the present invention. When the multipattern calculation is ended, the level of each of the ITG and the contact B2 is returned to high level in #32 (point g shown in FIGS. 13 (m) and 13 (n)). The integrating capacitors C1 and C11 to C51 in the photometric/light-controlling circuit 11 are discharged, and a preparation for the next light emission is made. In #33, the D/A conversion of the five channels is performed (at point h shown in FIGS. 13 (h) to 13 (l) in order to apply the gain setting voltage to the terminals VG1 to VG5 while reflecting the degree of weighting the divided regions obtained in #31 and estimating the adjustment of the gain with respect to the sensitivity of the film. As a result, the current the amplitude rate of which has been raised is integrated for the divided region which has been weighted by a larger degree.

After the above-described preparing operations have been completed, power supply to the front curtain magnet 31 is cancelled (at point i shown in FIG. 13 (d)) in order to start the actual shutter releasing operation in #35. As a result, the front curtain 87 commences the moving operation. In #36, the fact that the switch 36 is switched on after the shutter has been fully opened is waited for. When the same is switched on (at point j shown in FIG. 13 (g)), both the ITG and the contact B2 are lowered in #37 so as to instruct the flashing device 101 to start the intrinsic emission. Furthermore, the integrating operation of the photometric/light-controlling circuit 11 is permitted. Thus, the flashing device 101 emits light as designated as the waveform of emitted light shown in FIG. 13 (o). As a result, the integrating capacitor C1 is charged in the photometric/light-controlling circuit 11 with the sum of the elongated currents of the transistors Q11 to Q51 which have been weighted. When the above-described sum exceeds the predetermined reference voltage E2, the level of the STOP terminal is lowered from high level to low level so as to be supplied to the flashing device 101 via the contact B1 and S1. As a result, the light emitting operation of the flashing device 101 is stopped (point k shown in FIG. 13 (o)). At this time, the exposure for the photography performed while using the flashing device 101 as the light source is ended. The program in the microcomputer 12 counts the time elapsed from the stoppage of the power supply to the front curtain magnet 31 in #35 so as to stop the power supply to the rear curtain magnet 32 in #39 (point l shown in FIG. 13 (e))( when the established shutter time has elapsed. Furthermore, the levels of the two terminals ITG and the contact B2 are immediately returned to the high levels in #40 so as to prepare for the operation for shutter-releasing the next frame. Subsequently, when a shutter charge operating means, a mirror-down operating means or the like (omitted from illustration) are operated, the switches relating to each of the sequences are returned to the original switched-off state at points m and n shown in FIGS. 13 (c) and 13 (g). Thus, the shutter releasing operations are completed.

If the bit 0 of the SDATA 1 is 0 in #24, that is, if the flashing device 101 has selected the TTL normal light control mode, the pre-emission operations in #27 to #33 are not performed but the flow advances to #34 in which the D/A conversion of the five channels is performed in order to apply predetermined gain setting voltage to the terminals VG1 to VG5 while estimating only the film sensitivity so that each of the divided regions is uniformly weighted. Referring to the timing chart shown in FIG. 13, the change in the signal waveform is not changed from point d to point h shown in FIGS. 13(h) to 13(l) but the operation arranged to be performed at point h is performed at point d. Therefore, the last transition pulses from point e to point g of ITG and the contact B2 shown in FIGS. 13(m) and 13(n) are not transmitted in this case. As a result, the pre-emission from the flashing device 101 is not preformed. Then, the flow advances to #35 in which the above-described shutter release operation is started. As a result, the TTL normal light control is performed while subjecting all of the regions of the film surface to the uniform photometry (means photometry).

The operation of the portion including the flashing device 101 will now be described with reference to the timing chart shown in FIG. 13 and a flow chart shown in FIG. 15.

When power is supplied and the microcomputer 113 of the flashing device 101 commences the execution of its program, an included timer I starts time counting for 100 ms in #101 for the purpose of determining whether of not data is supplied from the camera body 1 for a predetermined time or longer. In next step #102, it is determined whether or not the input port P2 is low level, that is, the status of the light controlling mode switch 121 of the flashing device 101 is determined. If it is at the low level, that is, if the TTL multicontrol mode is selected, the bit 0 of the memory SDATA1 is set in #103. If it is at the high level, that is, the TTL normal light control mode has been selected, the above-described bit 0 is cleared in #104. Then, the flow advances to #108 in which the I/O port PX is set to the input mode before the I/O port PX, that is, the level of the contact S3 is determined in #109. In a case where it is the low level, a demand of the serial data communication is issued from the camera body 1. Therefore, the flow advances to #110 in which the port PX is switched to the output mode before the above-described port PX is switched to low level in #111. The camera body 1 thus recognizes the fact that the flashing device 101 has completed the preparation for the communication. As a result, the above-described serial data communication is started. After the communication has been ended, the port PX is returned to the high level in #113 before the counter of the timer I is reset in #114 and the counting for 100 ms is again started. On the other hand, if it is determined in #109 that the port PX is high level, the flow advances to #115 in which the completion of the time counting operation performed by the timer I is checked. If the time of 100 ms has elapsed, the bit 1 of the memory BDATA 1 is cleared in #116. That is, in the case where the camera body connected is a type which does not perform the serial data communication, it is determined that the subject camera body is a type which has no TTL normal light control mode. Therefore, a flag corresponding to this fact is independently cleared. If it has been determined in #115 that the time counting operation performed by the time I has not ended, the flow advances to #117 without performing the operation in #116.

In #117 and #118, it is determined whether or not the bit 0 of the memory SDATA 1 and the bit 1 of the BDATA 1 are respectively 1. The above-described determinations are made so as to determine: (1) whether or not the light control mode of the flashing device 101 is the TTL multicontrol mode; (2) whether or not the camera body 1 is a type capable of adapting to the TTL multicontrol. If the above-described bits are respectively 1, that is, if the flashing device 101 has selected the TTL multicontrol mode and the camera body 1 can be adapted to the TTL multicontrol, the flow advances to #120 in which the internal logic of the emission control circuit 112 is set so that trigger signals supplied through the contact S2 are used in such a manner that the first signal is used to perform the pre-emission and the second signal is used to the intrinsic emission. The emission control circuit 112 controls the emission operation in such a manner that the quantity of light emitted is limited to a predetermined quantity at the pre-emission process even if no emission stop signal is supplied through the contact S1. For example, if the flashing device 101 is a type the guide number of which is "32", the maximum quantity of light to be emitted at the pre-emission process is arranged to be about guide number "8" so that the quantity of energy to be consumed at the full light emission is restricted to 1/16 of the maximum value.

If it has been determined in #117 and 118, at least one of the bit 0 of the memory SDATA 1 and the bit 1 of the BDATA 1 is 0, that is, if the flashing device 101 is set to a mode other than the TTL multicontrol mode or if the camera body 1 is a type which can not perform the TTL multicontrol operation, the internal logic of the emission control circuit 112 is set so that the trigger signal for starting the light emission supplied through the contact S2 in #121 is used in a conventional manner in which the first trigger signal is used to intrinsically emit light. Then, the flow returns to #102 and the above-described processes are repeated.

The structure and the operation of each of the above-described two embodiments are arranged as described above. However, it is apparent that the serial data communication may be replaced by a structure in which exclusive contacts are used or another structure in which the contacts are commonly used with the other contacts and a hardware signal denoting the voltage level or the like is used in order to send/receive the mode switching information or the like between the camera body 1 and the flashing device 101. Furthermore, a portion of the contacts for performing the data communication may be commonly used with the contacts through which the emission start signal and the emission stop signal are passed by determining the timing. If the way of the combination is intentionally limited, for example, in a case where the compatibility in terms of the exterior with the conventional type is eliminated or a case where a flashing device is employed which is arranged in such a manner that it does not emit light after it has been completely charged, an effect can, of course, be obtained by selectively performing the arrangements for the automatic switching according to the present invention.

According to the embodiment shown in FIGS. 1A and 1B, the conventional TTL normal light control mode can be selected in accordance with the scene, status and the requirement of a photographer. In particular, according to the embodiment shown in FIG. 1B, the light control mode selection switch 121 is disposed adjacent to the flashing device 101. Since the TTL control mode selection switch is disposed adjacent to the flashing device 101, the TTL control mode selection switch, which is not used when a picture is taken without using the flashing device, is not present adjacent to the camera body 1. That is, according to the embodiment shown in FIG. 1B, the TTL control mode switching means appears only when the flashing device 101 is mounted on the camera body 1 for the purpose of performing the picture taking with the flashing device. Therefore, the operation for switching the TTL light control mode can be rationally performed in accordance with the scene or the status. Therefore, a TTL automatic light controlling camera system which can be extremely easily operated by a photographer can be realized.

As described above, according to the present invention, in a camera body and the flashing device which can be adapted to the TTL multicontrol system, the most suitable system can be automatically selected in a case where a photographer does not select the above-described TTL multicontrol system, it is combined with a conventional type or the flashing device has not been completely charged. Therefore, the functions possessed by the system at that time can be significantly easily exhibited without a necessity of performing a complicated operation.

Although the invention has been described in its preferred form with a certain degree of particularly, it is understood that the present disclosure of the preferred form maybe changed in the details of construction, and the combination and re-arrangement of parts may be resorted to without departing from the spirit and the scope of the invention as hereinafter claimed.

What is claimed is:

1. A flashing device operable in a first mode in which the flashing device emits preliminary light followed by main light emission, or a second mode in which the flashing device emits main light without preliminary light emission, said flashing device having means for detecting whether or not a camera body attached to the flashing device is operable to control said first mode, and having means for prohibiting operation of said flashing device in said first mode when said detecting means detects that said camera body is not operable to control said first mode.

2. A TTL automatic light controlling camera system comprising:
   a flashing device operable in a TTL normal light control mode in which main light is emitted, and operable in a TTL multicontrol mode in which preliminary light is emitted followed by main light emission;
   a camera body including photoelectric converting means for receiving, through a photographing lens, light reflected from a field to which said flashing device emits light, means responsive to said photoelectric converting means for obtaining information regarding quantities of preliminary light reflected from different regions of the field and for determining weighting coefficients corresponding to the different regions in accordance with said information, TTL multicontrol means responsive to said photoelectric converting means for controlling the stopping of main light emission from the flashing device in accordance with said weighting coefficients, and TTL normal light control means responsive to said photoelectric converting means for controlling the stopping of main light emission from the flashing device when the flashing device emits main light without emitting preliminary light;
   means provided in said flashing device for outputting a signal to said camera body indicating that said flashing device is in a state to respond to said TTL multicontrol means of said camera body; and
   means provided in said camera body for allowing said TTL multicontrol means to operate, in response to said signal.

3. A TTL automatic light controlling camera system comprising:
   a camera body capable of operation with a flashing device that is operable in a TTL normal light control mode, in which the flashing device emits main light, and operable in a TTL multicontrol mode, in which the flashing device emits preliminary light followed by main light emission, said camera body including photoelectric converting means for receiving, through a photographing lens, light reflected from a field to which said flashing device emits light, selecting means for selecting operation of said camera body in either a TTL multicontrol mode or TTL noremal light control mode, means responsive to said photoelectric converting means, when said TTL multicontrol mode is selected, for obtaining information regarding quantities of preliminary light reflected from different regions of the field, for determining weighting coefficients corresponding to the different regions in accordance with said information, and for controlling the stopping of main light emission from said flashing device in accordance with said weighting coefficients, and means responsive to said photoelectric converting means, when said TTL normal light control mode is selected, for controlling the stopping of main light emission from a flashing device based upon main light emission without preliminary light emission; and
   a flashing device attached to said camera body and operable in a TTL normal light control mode but not in a TTL multicontrol mode;
   wherein said camera body controls the stopping of the main light emission of the attached flashing device in response to said photoelectric converting means, irrespective of whether said selecting means selects the TTL multicontrol mode or the normal light control mode.

4. A TTL automatic light controlling camera system comprising:
   a camera body including photoelectric converting means for receiving, through a photographing lens, light reflected from a field to which a flashing device emits light and outputting information regarding the distribution of quantities of light reflected from the field, and TTL normal light control means for controlling the stopping of light emission from a flashing device in accordance with said information; and
   a flashing device attached to said camera body and capable of emitting preliminary light, followed by main light emission, and that is capable of emitting main light without preliminary light emission;
   wherein said camera body controls the attached flashing device to prohibit the preliminary light emission and to control the stopping of the main light emission in accordance with the output of said photoelectric converting means.

5. A TTL automatic light controlling camera system comprising:
   a camera body including photoelectric converting means for receiving, through a photographing lens, light reflected from a field to which a flashing device emits light, means responsive to said photoelectric converting means for obtaining information regarding quantities of preliminary light emitted by a flashing device and reflected from different regions of the field and for determining weighting coefficients corresponding to the different regions in accordance with said information, and TTL multicontrol means responsive to said photoelectric converting means for controlling the stopping of main light emission from a flashing device in accordance with said weighting coefficients; and
   a flashing device attached to said camera body and including selecting means for selecting operation of the attached flashing device in a first mode in which the attached flashing device emits preliminary light following by main light emission, or a second mode in which the attached flashing device emits main light without preliminary light emission;
   wherein said TTL multicontrol means controls the stopping of main light emitted by the attached flashing device, on the basis of only the main light emission thereof, when the selecting means selects the second mode.

6. A camera capable of controlling light emission of a flashing device comprising:
- photoelectric converting means for receiving, through a photographing lens, light reflected from a field to which a flashing device emits light, and outputting information regarding quantities of reflecting light corresponding to divided regions of the field;
- determining means for determining weighting coefficients corresponding to the divided regions in accordance with said information, based upon a preliminary light emission by a flashing device;
- TTL multicontrol means responsive to said photoelectric converting means for controlling the stopping of main light emission of a flashing device in accordance with said weighting coefficients; and
- means for detecting whether a flashing device attached to said camera is capable of operating in response to said TTL multicontrol means to emit preliminary light before main light emission.

7. A camera capable of controlling light emission of a flashing device comprising:
- photoelectric converting means for receiving, through a photographing lens, light reflected from a field to which a flashing device emits light, and outputting information regarding quantities of reflected light corresponding to divided regions of the field;
- determining means for determining weighting coefficients corresponding to the divided regions in accordance with said information, based upon a preliminary light emission by a flashing device;
- TTL multicontrol means responsive to said photoelectric converting means for controlling the stopping of main light emission of a flashing device in accordance with said weighting coefficients; and
- selecting means for selecting either a TTL multicontrol mode in which said TTL multicontrol means is operative or a TTL normal light control mode in which the stopping of main light emission by a flashing device is in response to said photoelectric converting means based upon main light emission without preliminary light emission.

8. A camera capable of controlling light emission of a flashing device comprising:
- photoelectric converting means for receiving, through a photographing lens, light reflected from a field to which a flashing device emits light, and outputting information regarding quantities of reflected light corresponding to divided regions of the field;
- determining means for determining weighting coefficients corresponding to the divided regions in accordance with said information, based upon a preliminary light emission by a flashing device;
- TTL multicontrol means responsive to said photoelectric converting means for controlling the stopping of main light emission from a flashing device in accordance with said weighting coefficients;
- detecting means for detecting whether of not charging of a flashing device is complete; and
- control means for allowing said TTL multicontrol means to operate when said detecting means detects that the charging of the flashing device is complete.

9. A flashing device capable of emitting preliminary light followed by main light and comprising:
- selecting means for selecting TTL normal light control in which only main light is emitted or TTL multicontrol in which preliminary light and main light are emitted sequentially;
- detecting means for detecting whether a camera body attached to said flashing device is operable in a TTL multicontrol mode; and
- light control means for allowing said flashing device to emit preliminary light and main light sequentially only when said selecting means selects the TTL multicontrol mode and said detecting means detects a camera body operable in said TTL multicontrol mode.

* * * * *